(12) United States Patent
Jeong et al.

(10) Patent No.: US 11,712,131 B2
(45) Date of Patent: Aug. 1, 2023

(54) BLENDER

(71) Applicant: LG ELECTRONICS INC., Seoul (KR)

(72) Inventors: Jeonghoon Jeong, Seoul (KR); Hyunwoo Park, Seoul (KR); Kijoong Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 242 days.

(21) Appl. No.: 17/076,202

(22) Filed: Oct. 21, 2020

(65) Prior Publication Data

US 2021/0121021 A1 Apr. 29, 2021

(30) Foreign Application Priority Data

Oct. 24, 2019 (KR) .................. 10-2019-0133184

(51) Int. Cl.
| | |
|---|---|
| A47J 43/07 | (2006.01) |
| A47J 43/046 | (2006.01) |
| B01F 27/808 | (2022.01) |
| B01F 35/45 | (2022.01) |
| B01F 101/00 | (2022.01) |

(52) U.S. Cl.
CPC ......... *A47J 43/0716* (2013.01); *A47J 43/046* (2013.01); *B01F 27/808* (2022.01); *B01F 35/453* (2022.01); *B01F 2101/1805* (2022.01)

(58) Field of Classification Search
CPC .......................... A47J 43/046; A47J 43/0716
See application file for complete search history.

(56) References Cited

U.S. PATENT DOCUMENTS

| | | | |
|---|---|---|---|
| 2007/0140048 A1* | 6/2007 | Ismail .................. | A47J 43/085 366/205 |
| 2015/0098298 A1 | 4/2015 | Sapire | |
| 2015/0098299 A1 | 4/2015 | Sapire | |

FOREIGN PATENT DOCUMENTS

| | | | |
|---|---|---|---|
| CN | 105996822 A | * | 10/2016 |
| CN | 105996822 A | | 10/2016 |
| CN | 206462904 U | * | 9/2017 |
| CN | 206462904 U | | 9/2017 |
| EP | 1316284 B1 | | 9/2006 |
| KR | 20-0274311 Y1 | | 5/2002 |
| KR | 10-2013-0079958 A | | 7/2013 |
| KR | 2013079958 A | * | 7/2013 |
| KR | 20-0468445 Y1 | | 8/2013 |
| WO | 2020226459 A1 | | 11/2020 |
| WO | 2020226463 A1 | | 11/2020 |

* cited by examiner

*Primary Examiner* — Shelley M Self
*Assistant Examiner* — P Derek Pressley
(74) *Attorney, Agent, or Firm* — Dentons US LLP

(57) ABSTRACT

A blender includes a container body to receive food; a blender body to support the container body; a container lid removably mountable to the upper surface of the container body to open and close the upper surface of the container body; and a discharge part provided at the blender body to guide the discharge of liquid or foreign matter accumulated on the upper surface of the blender body to the outside. Accordingly, foreign matter or liquid accumulated on the upper surface of the blender body is prevented from being introduced into a motor assembly, among others.

12 Claims, 14 Drawing Sheets

[FIG.1]
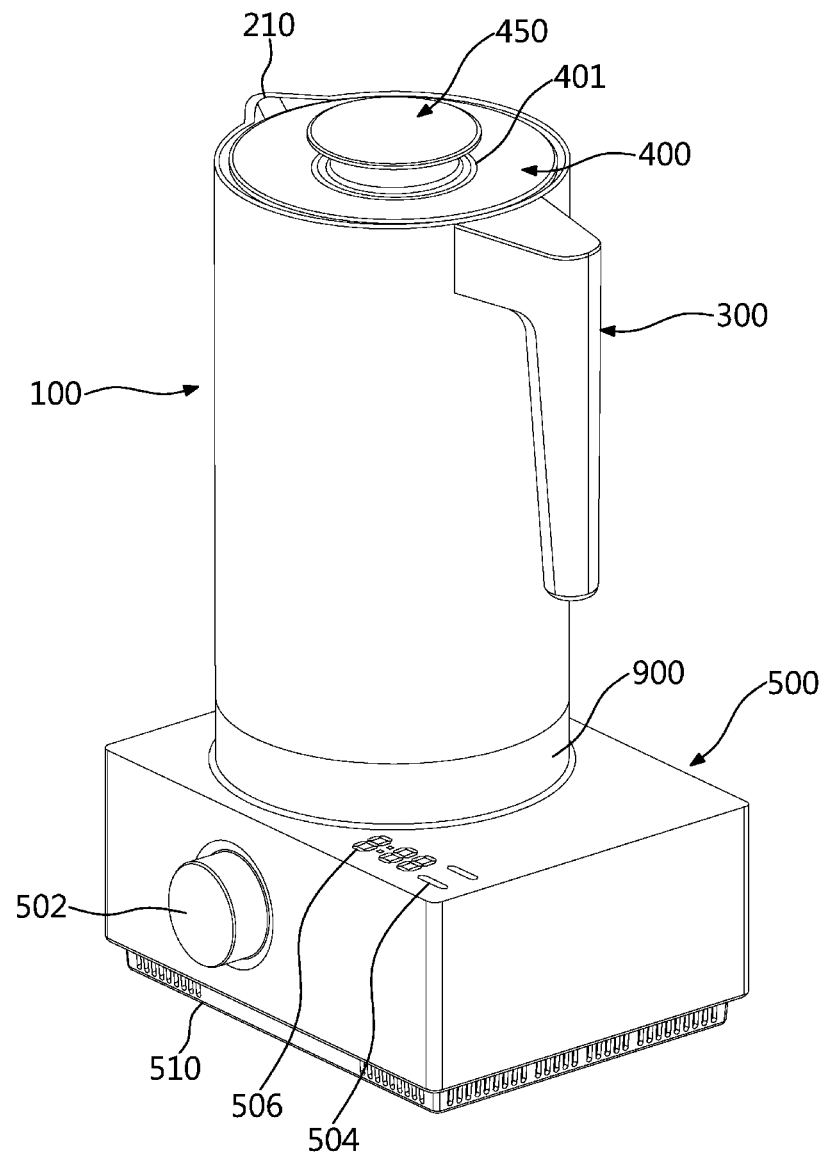

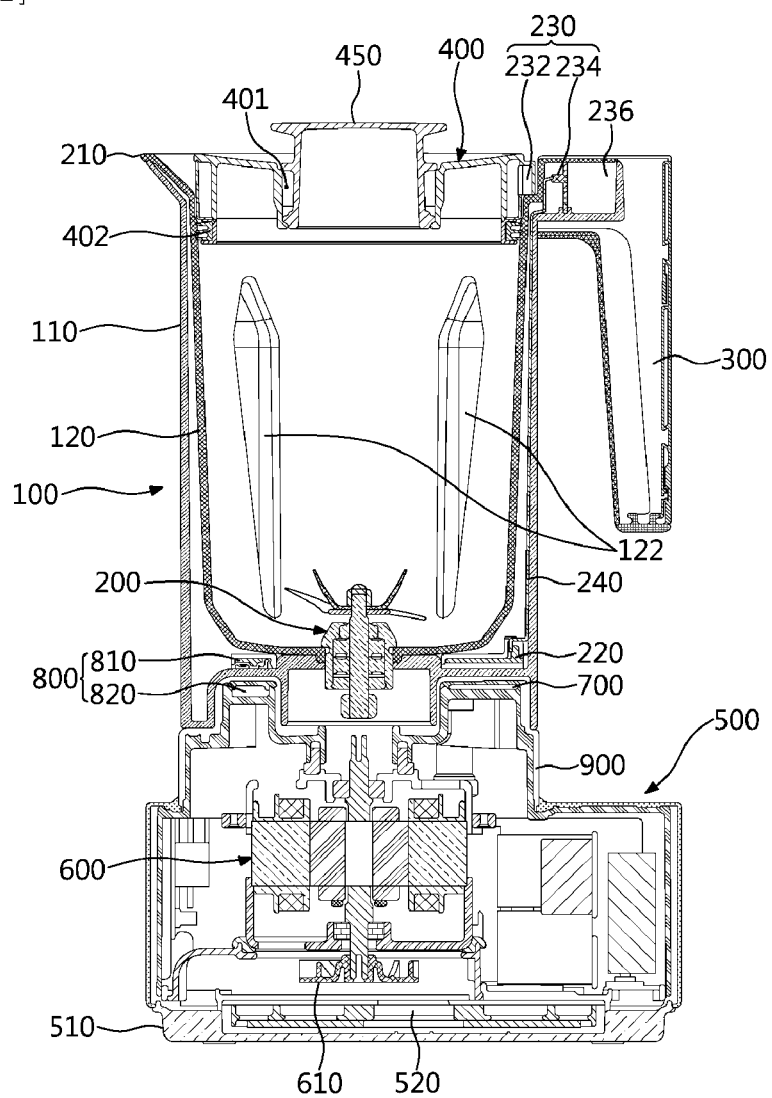
[FIG.2]

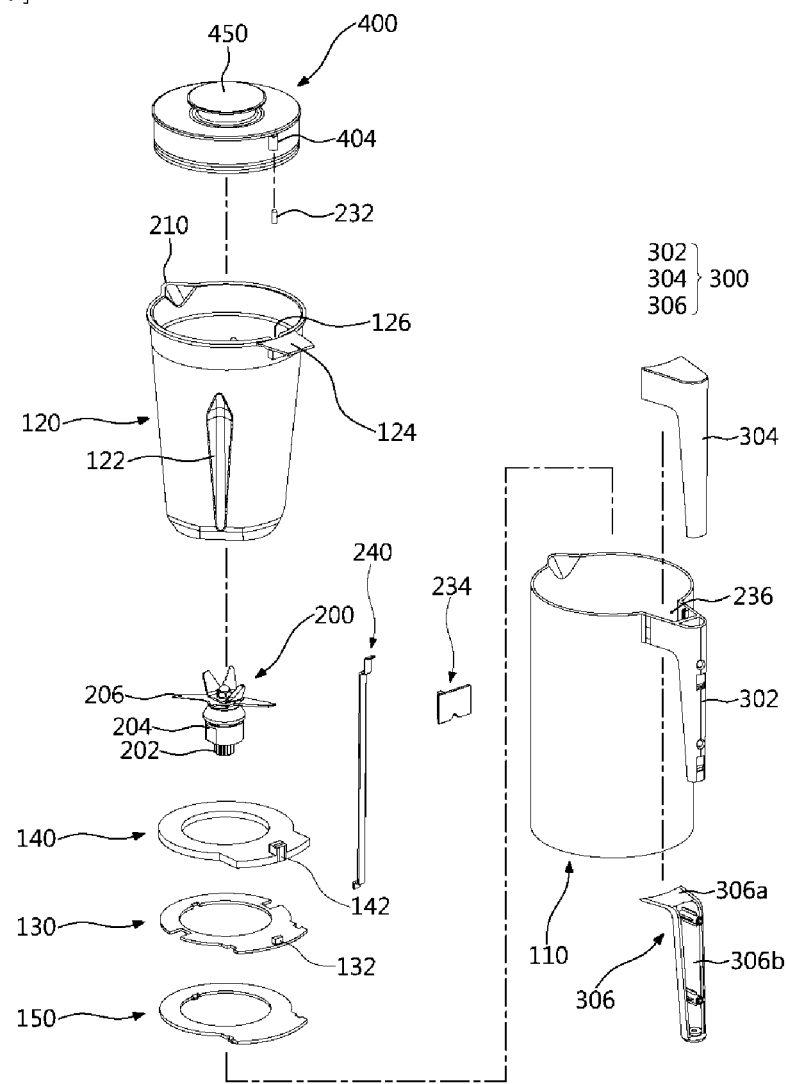
[FIG.3]

[FIG.4]
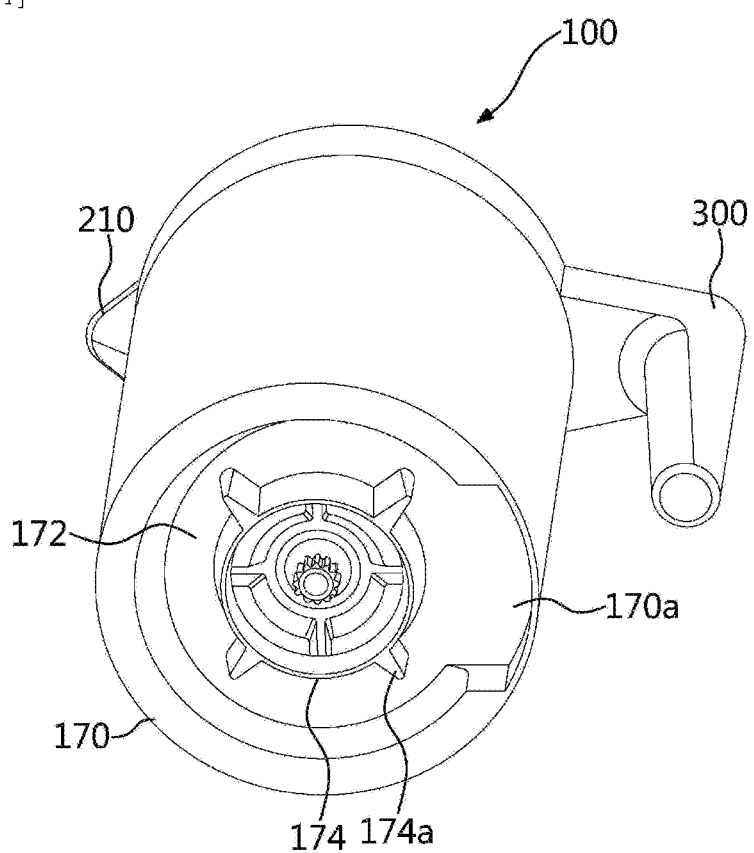

[FIG.5]
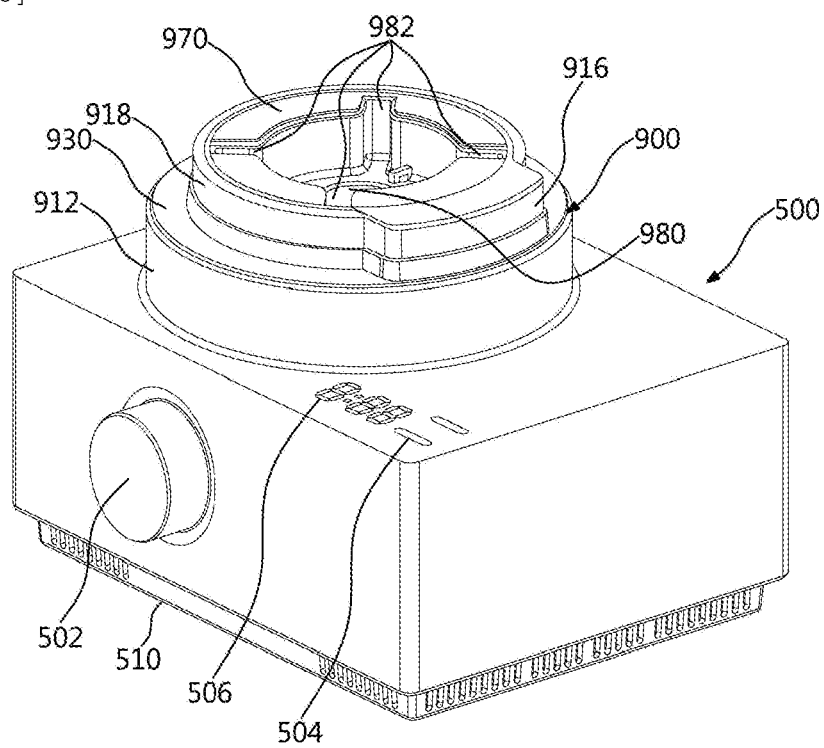

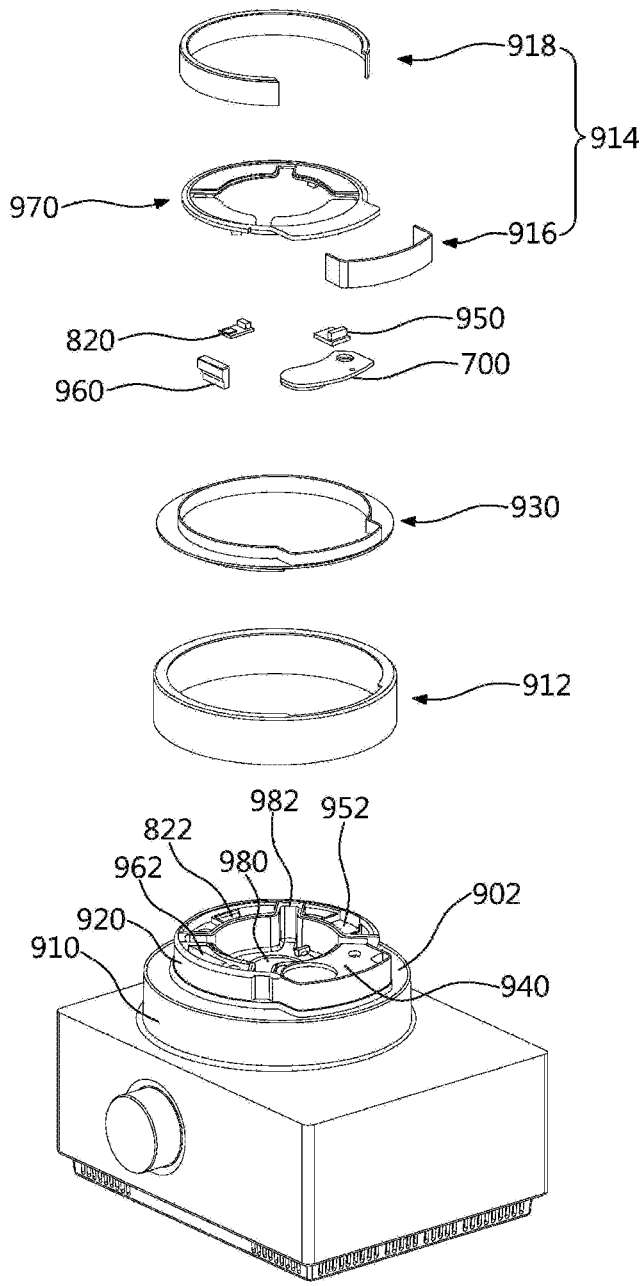
[FIG.6]

[FIG.7]
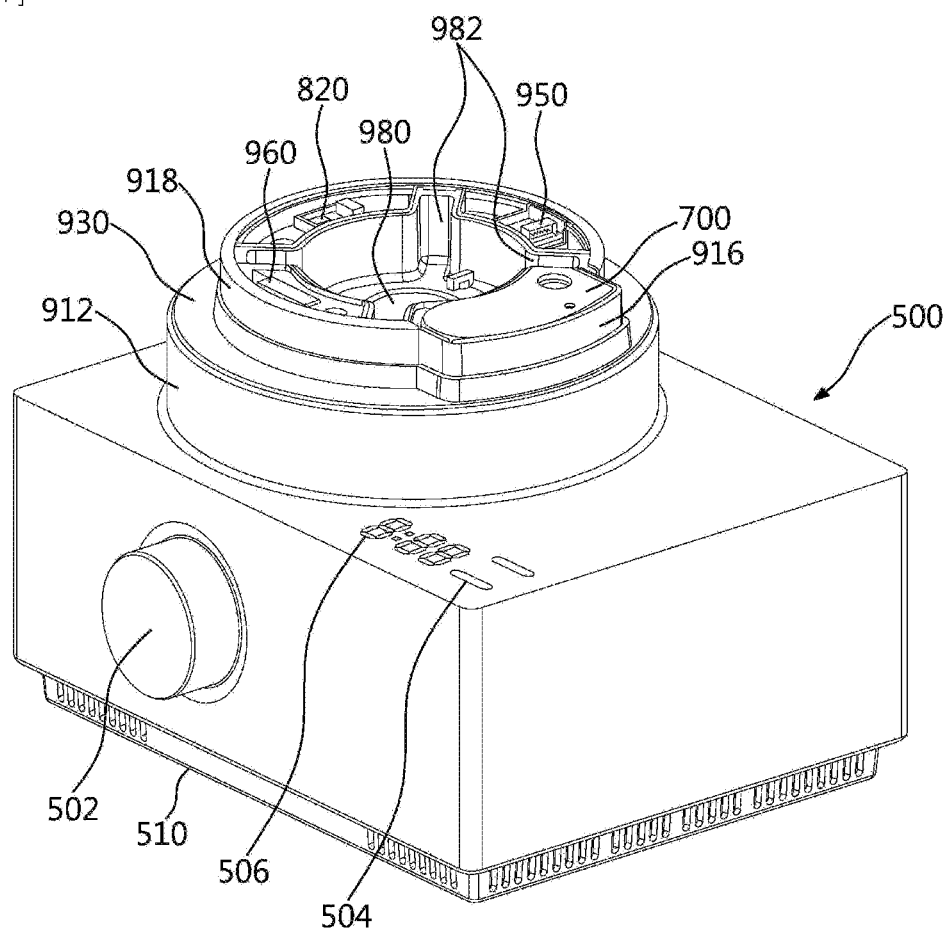

[FIG.8]

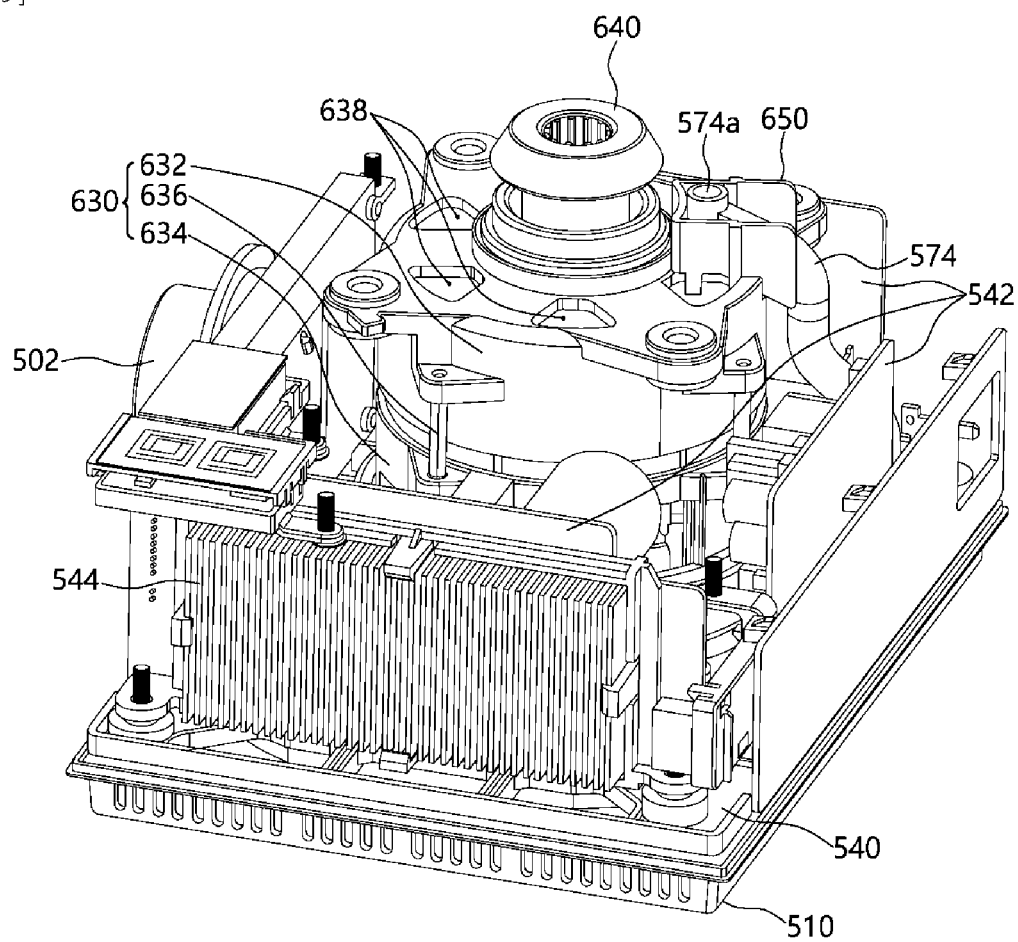
[FIG.9]

[FIG.10]
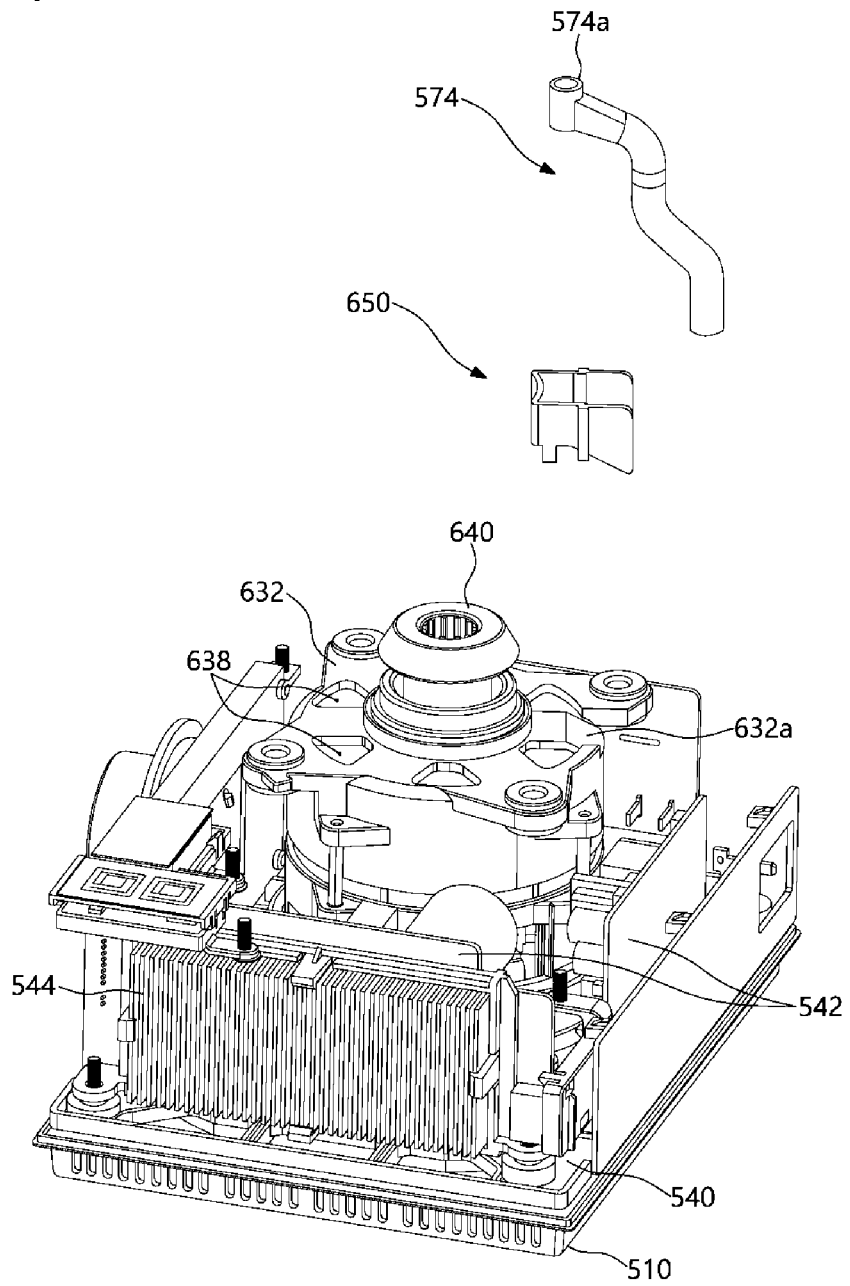

[FIG.11]
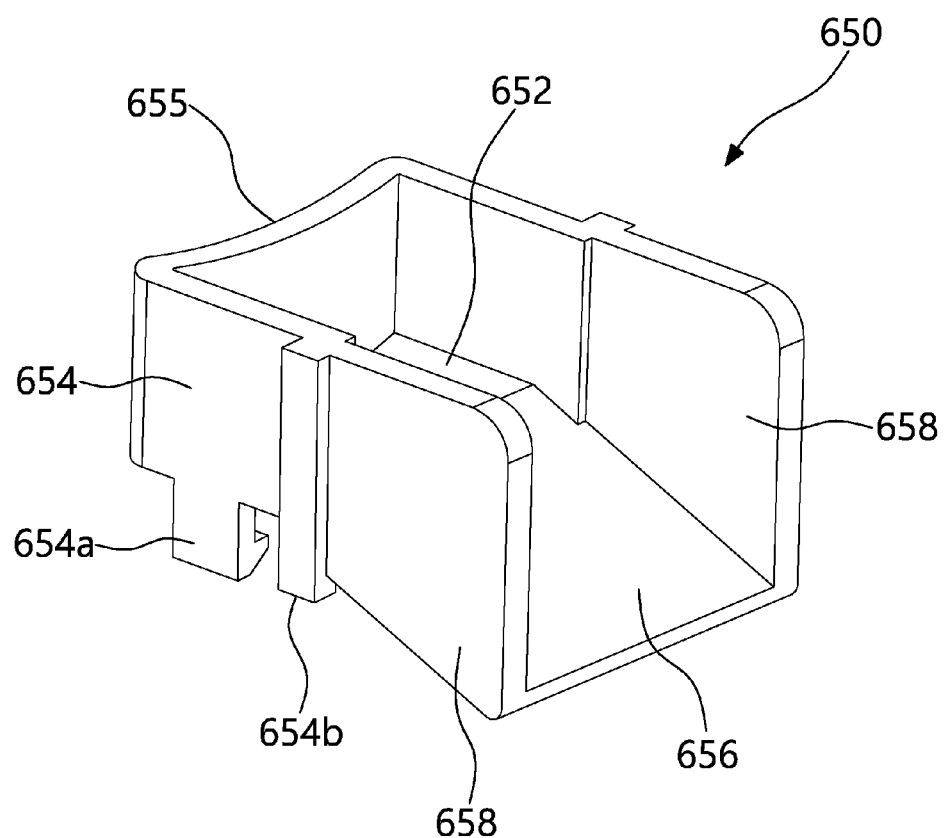

[FIG.12]
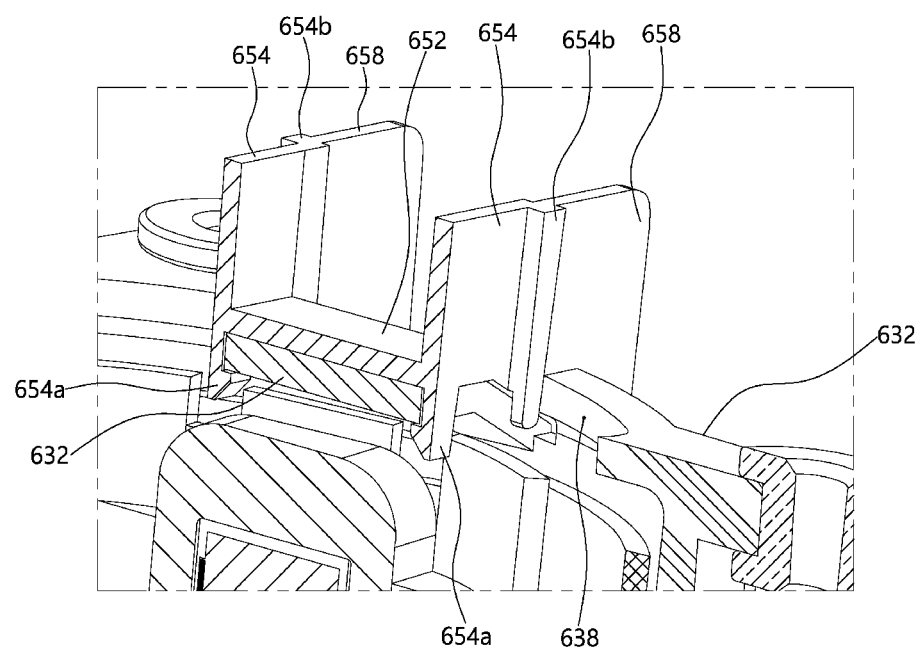

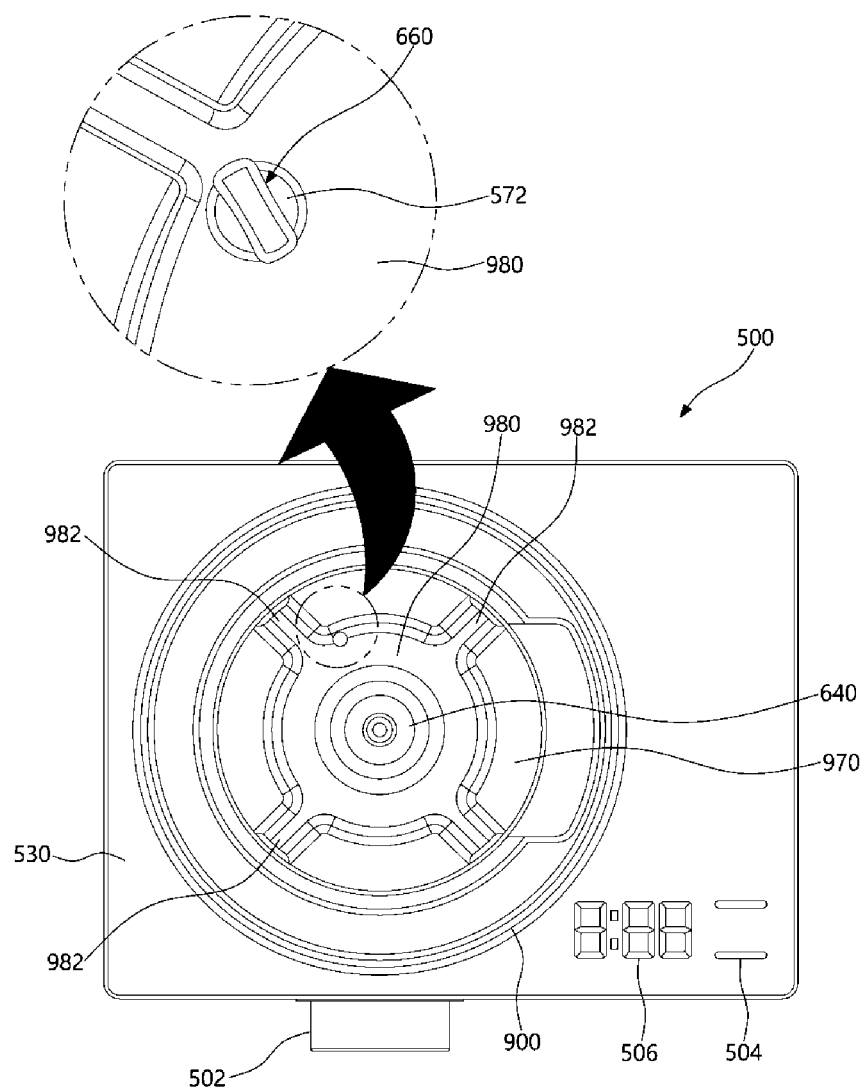

[FIG.14]
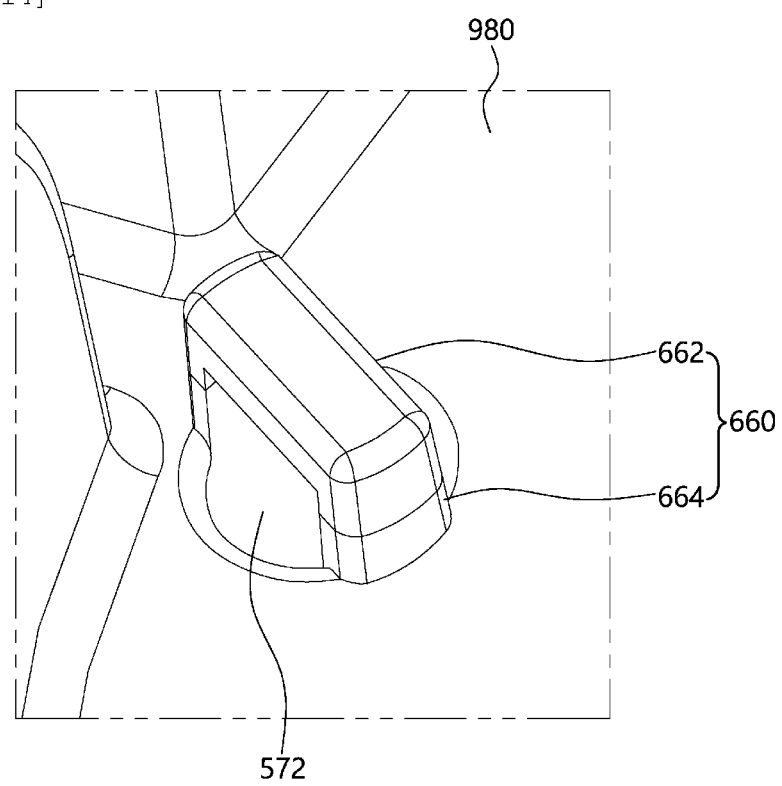

BLENDER

CROSS REFERENCE TO RELATED APPLICATION

The present application claims priority to Korean Patent Application No. 10-2019-0133184, filed Oct. 24, 2019, the entire contents of which is incorporated herein for all purposes by reference.

BACKGROUND OF THE DISCLOSURE

Field of the Disclosure

The present disclosure relates generally to a blender. More particularly, the present disclosure relates to a blender which has the function of allowing liquid such as water introduced into a blender body to be discharged to the outside.

Description of the Related Art

Generally, a blender is referred to as a mixer or crusher, and is mainly used for crushing or chopping food contained in a container body by rotating blades powered by a motor.

In a normal blender, a blender body having a motor operated by electricity is located at the lower side of the blender, and the container body receiving food is seated on the upper side of such a blender body. Blades crushing or chopping food are provided inside the container body, and are rotated by the rotational force of the motor.

Accordingly, when a user drives the motor by using a manipulation button or a knob of the blender body after putting food in the container body, the blades receiving the rotational force generated by the motor crush or chop food contained inside the container body.

Such a blender has recently been developed in accordance with a desire to facilitate the food intake of office workers due to their busy daily life. That is, a small hand blender has been developed, and a blender has been developed that allows food to be crushed in a larger capacity or at high speed.

In addition, to process food ingredients contained in a container body of a blender in a fresher state, a vacuum blender, which cuts or crushes food in a vacuum state inside of the container body has been disclosed.

However, in these various types of blenders, food or liquid such as water from the outside or liquid flowing down from the container body may be introduced into the blender body and damage the motor or electronic parts such as a printed circuit board (PCB).

For example, like a blender disclosed in Korean Patent No. 10-1713194, a blender normally has a blender body under the container body which is located at an upper side of the blender, and a motor and electronic parts such as a PCB are provided inside such a blender body. The center of the upper surface of the blender body is depressed concavely.

Accordingly, water or liquid flowing down from the container body is accumulated on the concave portion of the upper surface of the blender body, and the liquid is introduced into the blender body causing an electrical discharge or malfunction of the blender to occur.

SUMMARY OF THE DISCLOSURE

Accordingly, the present disclosure has been made keeping in mind the above problems occurring in the related art, and the present disclosure is intended to propose a blender which allows water accumulated on the upper portion of a blender body to be easily discharged to the outside.

In addition, the present disclosure is intended to propose a blender which is configured to prevent liquid introduced into the blender body from being introduced into a motor assembly.

Furthermore, the present disclosure is intended to propose a blender, wherein a discharge hose guiding the discharge of liquid on the upper portion of the blender body to the outside is prevented from being blocked by foreign matter.

In order to achieve the above proposals, according to one aspect of the present disclosure, there is provided a blender including a discharge part guiding the discharge of liquid or foreign matter accumulated on the upper surface of a blender body to the outside. Accordingly, electronic parts located inside the blender body may be prevented from malfunctioning or being damaged by the liquid or foreign matter.

In the present disclosure, a discharge guide may be provided on the upper side of a motor assembly. Accordingly, even when liquid is introduced into the blender body, the liquid may be prevented from being introduced into the motor assembly.

In the present disclosure, a slanting seating guide surface may be provided on the upper surface of the motor assembly. Accordingly, water accumulated in the discharge guide may flow to the outside of the motor assembly.

In the present disclosure, the discharge guide may be mounted to the motor assembly by a guide hook.

In the present disclosure, a blocking rib may be provided at a side of a discharge hole. Accordingly, foreign matter may be prevented from being introduced into the discharge hole.

Meanwhile, the blender of the present disclosure may include: a container body configured to receive food; a blender body provided at the lower side of the container body and supporting the container body; the container lid mounted removably to the upper surface of the container body and opening and closing the upper side of the container body; and the discharge part provided at a side of the blender body and guiding the discharge of liquid or foreign matter accumulated on the upper surface of the blender body to the outside.

The discharge part may include the discharge hole guiding liquid or food accumulated on the upper surface of the blender body downward, and a discharge hose provided at a side of the discharge hole and guiding the liquid or food falling downward through the discharge hole to the lower end of the blender body.

The discharge guide may be provided in the blender body, the discharge guide supporting an end of the discharge hose.

The motor assembly generating a rotational power may be provided in the blender body, and the discharge guide may be provided on the upper surface of the motor assembly.

The seating guide surface may be formed in the motor assembly to seat the discharge guide thereon.

The seating guide surface may be formed on the upper surface of a motor housing constituting the motor assembly.

The seating guide surface may be formed by slanting downward to have height gradually decreasing from the upper surface of the motor housing.

The discharge guide may include: a seating surface placed on the upper surface of the motor housing; a pair of side surfaces formed by bending upward and extending from the opposite ends of the seating surface; an inner surface connecting the pair of side surfaces to each other; and a discharge guide surface formed by extending from the seating surface and being in close contact with the seating guide surface.

The inner surface may be configured as a plate having a curvature rounded by protruding from the center of the blender body towards the outside.

The discharge guide surface may have an inclination corresponding to the inclination of the seating guide surface.

A pair of side surface guides may be formed on the opposite ends of the discharge guide surface by extending from the pair of side surfaces.

A guide hook may be provided in the discharge guide, the guide hook allowing the discharge guide to be mounted to the motor housing.

The guide hook may be formed by extending downward from the pair of side surfaces.

A guide rib may be provided in the discharge guide, the guide rib allowing the discharge guide to be maintained at a predetermined position thereof after the discharge guide is mounted to the upper surface of the motor housing.

The guide rib may be formed by extending downward from the pair of side surfaces or the pair of side surface guides.

The guide rib may be inserted into a housing hole formed vertically through the upper surface of the motor housing.

A hole connection part may be formed on the lower end of the discharge hole by extending downward therefrom, and may guide the liquid and foreign matter, which are introduced through the discharge hole, towards the inside of the blender body.

A press-fit end covering the hole connection part may be provided on the upper end of the discharge hose such that the discharge hose is coupled to the hole connection part.

The press-fit end may be placed on the upper surface of the seating surface of the discharge guide.

A hose holder may be provided in the blender body, the hose holder allowing the lower end of the discharge hose to be fixed to the lower end of the blender body.

The blocking rib may be provided on the discharge hole so as to block foreign matter from being introduced thereinto.

The blocking rib may include a crossbar crossing the discharge hole, and a support part allowing the crossbar to be spaced apart by a predetermined distance from the upper end of the discharge hole.

The blender of the present disclosure has the following effects.

First, in the present disclosure, a transparent electrode film may be vertically attached to the surface of a transparent container body such that electricity flows in the vertical directions of the container body so as to detect whether the container lid is removed from the container body. Accordingly, the design of the appearance of the transparent container body is not damaged, and the container lid can be detected. That is, the design freedom of the container body is improved.

Second, in the present disclosure, the transparent electrode film may be provided between an outer container body and an inner container body. That is, the transparent electrode film may be attached to the inner surface of the outer container body. Accordingly, the transparent electrode film is not exposed to the outside and fixed to the inner surface, so disconnection thereof due to external interruption or contamination thereof due to external foreign matter is prevented.

Third, in the present disclosure, a cap may be provided by protruding upward at the center of the container lid. Accordingly, a user may remove or install the container lid by holding the upper end of the cap with their hand without directly holding the edge of the container lid with their hand, thereby improving usability.

Fourth, in the present disclosure, the cap mounted to the container lid may be mounted thereto or removed therefrom by a user grasping and rotating the cap by hand. Accordingly, even without removing the container lid from the container body, the user may insert food into the container body or mix food contained in the container body by removing the cap from the container lid mounted to the container body, thereby improving usability.

Fifth, in the present disclosure, the discharge part guiding the discharge of liquid or foreign matter accumulated on the upper surface of the blender body to the outside is provided. Accordingly, electronic parts located inside the blender body are prevented from malfunctioning or being damaged by liquid such as water introduced from the outside.

Sixth, in the present disclosure, the discharge guide is provided on the upper side of the motor assembly. Accordingly, even when liquid or foreign matter is introduced into the blender body, the liquid or foreign matter is prevented from being introduced into the motor assembly, so a coil or magnet inside the motor is prevented from being contaminated by liquid or foreign matter, thereby preventing power loss, breakdown, and electrical discharge.

Seventh, in the present disclosure, the discharge guide downward guiding outside liquid is mounted to the motor assembly by the guide hook by one touch, and the mounted state of the discharge guide is maintained by the guide rib, thereby facilitating the mounting of the discharge guide and preventing the rotation and movement of the discharge guide.

Eighth, in the present disclosure, the blocking rib may be provided on the upper side of the discharge hole. Accordingly, foreign matter is prevented from being introduced into the discharge hole, so the discharge hole is prevented from being blocked by the foreign matter.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a perspective view illustrating a configuration of a blender according to an embodiment of the present disclosure;

FIG. 2 is a vertical cross-sectional view illustrating an internal configuration of the blender according to the embodiment of the present disclosure;

FIG. 3 is an exploded perspective view illustrating a detailed configuration of a container body according to the embodiment of the present disclosure;

FIG. 4 is a bottom perspective view of the container body according to the embodiment of the present disclosure;

FIG. 5 is a perspective view of a blender body according to the embodiment of the present disclosure;

FIG. 6 is an exploded perspective view illustrating a configuration of an upper half part of the blender body according to the embodiment of the present disclosure;

FIG. 7 is a perspective view illustrating a configuration of the blender body from which a cover is removed according to the embodiment of the present disclosure;

FIG. 8 is a cut-away view illustrating a configuration of an inside of the blender body according to the embodiment of the present disclosure;

FIG. 9 is a perspective view illustrating a configuration of the inside of the blender body from which a seating step and a blender body casing are removed according to the embodiment of the present disclosure;

FIG. 10 is an exploded perspective view illustrating the blender body from which a discharge hose and a discharge guide are removed according to the embodiment of the present disclosure;

FIG. 11 is a perspective view illustrating a detailed configuration of the discharge guide according to the embodiment of the present disclosure;

FIG. 12 is a partial cut-away perspective view illustrating a state of the discharge guide mounted to a motor assembly according to the embodiment of the present disclosure;

FIG. 13 is a top plan view of the blender body according to the embodiment of the present disclosure; and FIG. 14 is a partial perspective view illustrating a mounted state of a blocking rib according to the embodiment of the present disclosure.

DETAILED DESCRIPTION OF THE DISCLOSURE

Hereinafter, a blender of the present disclosure will be described in detail with reference to the accompanying drawings.

FIGS. 1 and 2 are a perspective view and a vertical sectional view, respectively, illustrating a configuration of the blender according to an embodiment of the present disclosure.

As illustrated in these drawings, the blender of the present disclosure may include a container body 100 located relatively at the upper side thereof and receiving food, and a blender body 500 provided at the lower side of the container body 100 and supporting the container body 100.

The container body 100 may be a part in which food is received and the process of cutting or crushing the food occurs, and the blender body 500 may support the container body 100. Furthermore, multiple parts may be provided inside such a blender body 500 to control the cutting or crushing of the food received in the container body 100, or to supply electric power.

The container body 100 may have a cylindrical shape as a whole, and the upper surface thereof may be configured to be open to introduce food thereinto.

The container body 100 may be made of a transparent material such that the inside thereof can be seen from the outside. That is, the container body 100 may be made of glass or transparent plastic so that a user can check the state of food contained inside the container body 100 from the outside.

A blade assembly 200 may be provided in the inner lower portion of the container body 100. The blade assembly 200 may have multiple blades 206 (see FIG. 3) mounted rotatably thereto such that the blades chop or crush food received in the container body 100. The blades can turn food into liquid. In the disclosure, liquid also includes liquefied food.

The blade assembly 200 may be connected to a motor assembly 600 to be described below, and be configured to be rotated by the rotational force generated by the motor assembly 600.

The container body 100 may be formed doubly. That is, the container body 100 may be composed of an outer container body 110 constituting the appearance thereof and an inner container body 120 provided inside the outer container body 110. The outer container body 110 and the inner container body 120 may be configured to be in contact with each other or to be spaced apart by a predetermined distance from each other. Furthermore, only a portion of each of the outer container body 110 and the inner container body 120 may be configured to be in contact with each other. Of course, the container body 100 may be formed with a single body.

At least one inner guide 122 may be provided in the container body 100 to have a predetermined length in a vertical direction. The inner guides 122 are intended to guide food rotating in the container body 100, and may be configured in pairs symmetrical to each other in the front and rear or left and right of the inner container body 120.

A handle 300 grasped by a user may be formed by protruding from the right surface of the container body 100 to the right side. Such a handle 300 may be formed such that a user can grasp the handle with their hand, and in the present disclosure, the upper end of the handle is illustrated to be connected integrally to the upper surface of the container body 100.

Meanwhile, a spout 210 may be formed at the opposite side to the handle 300.

As illustrated in the drawing, the spout 210 may be formed on the upper end of the left surface of the container body 100, and may be a part through which food completely crushed in the container body 100 is guided to be easily poured to the outside. Accordingly, such a spout 210 may be formed to gradually protrude more in the left direction going upward.

The upper surface of the container body 100 may be covered by a container lid 400. That is, the container lid 400 may be removably mounted to the upper surface of the container body 100, and open and close the upper surface of the container body 100.

The container lid 400 may cover the upper surface of the container body 100 such that the food contained in the container body 100 does not splatter to the outside and foreign matter from the outside is not introduced into the container body 100. In the disclosure, foreign matter includes pieces of food or other objects.

The container lid 400 may be configured to be mounted to the container body 100 through pressing or rotating the container lid 400 by a user. A gasket 402 may be provided in the outer circumferential surface of the container lid 400 to block a gap between the container lid 400 and the container body 100. Of course, such a gasket 402 may function to allow the container lid 400 to be pressed and fitted into the container body 100.

A cap 450 may be provided in the container lid 400. That is, a lid hole 401 which is a circular hole having a predetermined size may be formed vertically through the center of the container lid 400, and the cap 450 may be mounted to such a lid hole 401 and cover the lid hole 401.

As illustrated in the drawings, the cap 450 may be installed at the center of the container lid 400, and as a whole, may be formed to have a diameter smaller than the diameter of the container lid 400. The cap 450 may be removably mounted to the container lid 400 through forcible fitting by pressing or by rotating.

In the present disclosure, the cap 450 is configured to be attached and detached from the container lid 400 by being rotated, and a detailed configuration thereof will be described below.

Since the cap 450 may be removably mounted to the container lid 400, a user may see the food contained inside the container body 100 by opening only the cap 450 without opening the container lid 400, and insert food into the container body 100 by opening the cap 450, or insert a mixing rod thereinto and stir the food contained inside the container body 100.

The upper end of the cap 450 may be configured by protruding from the upper end of the container lid 400, so that the cap 450 may function as the handle of the container lid 400 to be grasped by a user when the user opens or closes the container lid 400.

As illustrated in the drawings, the blender body 500 may be configured to have a hexahedral shape having the shape of a rectangular box as a whole and be provided under the container body 100 so as to support the container body 100, wherein the motor assembly 600 and multiple electronic parts such as a PCB (a printed circuit board) may be installed inside the blender body 500. Of course, the external shape of such a blender body 500 may be variously changed as required.

The motor assembly 600 may be provided at the center of the inside of the blender body 500. The motor assembly 600 may generate a rotational force by power supplied from the outside so that the blades 206 constituting the blade assembly 200 rotate.

Accordingly, the lower end of the blade assembly 200 may be connected to the upper end of the motor assembly 600.

A knob 502 may be provided on the front surface of the blender body 500 by protruding forward therefrom. The knob 502 is intended to set the operation of the blender of the present disclosure, and may be rotatably mounted to the blender body 500.

The knob 502 may be configured to control the operation intensity of the motor assembly 600. That is, the knob 502 may be configured to change the rotational speed of the motor assembly 600 to high speed or low speed by the clockwise or counterclockwise rotation of the knob 502.

Meanwhile, a manipulation part 504 may be provided on the upper surface of the blender body 500.

The manipulation part 504 is intended to manipulate the blender of the present disclosure by touching, and may be configured to manipulate the starting and stopping of the operation of the blender.

Of course, the knob 502 and the manipulation part 504 may be configured to selectively set or manipulate the operation of the blender, or may be configured to overlap with each other in the functions of the setting and manipulating. That is, for convenience, the knob 502 and the manipulation part 504 may be configured to overlap with each other in the functions such that a user may select any one of the knob 502 or the manipulation part 504 to set or manipulate the operation of the blender.

A display part 506 may be provided at a side of the manipulation part 504 (a left side of FIG. 1). That is, the display part 506 may be provided on the upper surface of the blender body 500. Such a display part 506 may function to display the state of the operation of the blender such that a user can check the state thereof. Accordingly, such a display part 506 may be configured as a seven-segment display.

A cooling fan 610 may be provided at the lower side of the motor assembly 600.

The cooling fan 610 may be connected to the lower end of the motor assembly 600 and be rotated by a rotating force generated by the motor assembly 600, thereby introducing an outside air into the blender body 500 and forcing the flow of the air. Accordingly, the cooling fan 610 may allow air to be introduced into the blender body 500 from the outside and to flow therein, and function to cool parts such as the PCB provided in the blender body 500.

A base end 510 may be provided on the lower surface of the blender body 500.

The base end 510 may be formed by protruding downward from the lower surface of the blender body 500 and, in one embodiment, may have a space having a predetermined size therein to receive a wireless power module 520. The wireless power module 520 may function to receive external wireless power in a wireless method using induced electromotive force and to supply the wireless power to the motor assembly 600 provided inside the blender body 500. Of course, the blender body may be formed with a power cord to connect to an external power source.

Meanwhile, a detection system may be provided in the blender body 500 and the container body 100 described above so as to detect whether the container lid 400 is mounted to the container body 100.

The detection system may allow an electric circuit which can be turned on and off to be formed in the container body 100, and allow such an electric circuit to form a closed circuit, so that the detection system may be configured to detect whether electric current flows in the closed circuit by voltage supplied by the blender body 500.

More particularly, the detection system may include: a power transmission means 700 provided in the blender body 500 and supplying power to the container body 100; a power reception means 220 provided in the container body 100 and receiving the power supplied by the power transmission means 700; an on/off means 230 provided at the upper side of the container body 100 and turning on/off the electric circuit formed in the container body 100 depending on whether the container lid 400 is closed; a transparent electrode film 240 made of a transparent material provided on a surface of the container body 100 and connecting the power reception means 220 and the on/off means 230 to each other so as to allow electricity to flow therebetween; and a detection means 800 provided on one side of the blender body 500 or the container body 100 and allowing the electric circuit formed by the connection of the power reception means 220 with the on/off means 230 to form the closed circuit so as to detect whether the current flows.

The power transmission means 700 is intended to transmit power, which is introduced to the blender body 500 from the outside of the blender body 500 or stored in advance in the blender body 500, to the container body 100, and may use an inductive coil in which the induced electromotive force can be generated.

The power reception means 220 is intended to receive the power transmitted from the blender body 500, and may be configured to have a structure corresponding to the structure of the power transmission means 700. That is, the power reception means 220 may use an inductive coil such that the power is transmitted by the induced electromotive force generated between the power transmission means 700 and the power reception means 220.

The power transmission means 700 and the power reception means 220 may be located to be adjacent to each other so as to generate the induced electromotive force. Accordingly, in the present disclosure, the power transmission means 700 is illustrated to be mounted to the right upper end of the blender body 500, and the power reception means 220 is illustrated to be mounted to the right lower end of the container body 100.

The on/off means 230 may be configured to turn on/off the electric circuit formed in the container body 100 depending on whether the container lid 400 is mounted to the container body 100, and may include a permanent magnet 232 and a reed switch 234 provided in the container lid 400 and the container body 100, respectively.

As illustrated in FIG. 2, in the present disclosure, the permanent magnet 232 is illustrated to be mounted to the right edge of the container lid 400, and the reed switch 234 is illustrated to be mounted to the right upper end (a portion of the handle) of the container body 100.

More particularly, the reed switch 234 may be mounted to be received in a reed switch groove 236 formed in the upper end portion of the handle 300.

It is widely known that the reed switch has magnetic movable contacts enclosed in a glass tube, and when a magnet approaches the reed switch, the contacts in the glass tube contact with each other. Here, further detailed description of the configuration and principle of the reed switch will be omitted.

Of course, except for the use of the permanent magnet 232 and the reed switch 234 of such an on/off means 230, other electric on/off means or mechanical structures may be used to turn on/off the electric circuit, and the mounting positions of the permanent magnet 232 and the reed switch 234 respectively mounted to the container lid 400 and the container body 100 may be exchanged oppositely.

Various types of electrical devices or structures having a function that can detect whether electric current flows in the electric circuit formed in the container body 100 turned on/off by the on/off means 230 may be used as the detection means 800. However, in the present disclosure, a photodetector is used to detect light as an example.

Accordingly, the detection means 800 may include a light transmission module 810 provided in the container body 100 to generate light, and a light reception module 820 provided in the blender body 500 to receive the light transmitted by the light transmission module 810.

The light transmission module 810 and the light reception module 820 may be located at positions adjacent to each other. In the present disclosure, as illustrated in FIG. 2, the light transmission module 810 may be located on the left lower end of the container body 100, and the light reception module 820 may be located on the left upper end of the blender body 500.

The light transmission module 810 may use a light emitting diode (LED) that emits light by electricity, and the light reception module 820 may use the photodetector that receives light and changes the light into an electrical signal.

In addition, the transparent electrode film 240 may be provided between the outer container body 110 and the inner container body 120. For example, the transparent electrode film 240 may be attached to the inner surface of the outer container body 110.

The transparent electrode film 240 may be made of a transparent material such as an ITO film (an indium-tin oxide film) and may be attached to the surface of the container body 100, and may allow the on/off means 230 provided on the upper side of the container body 100 to be connected to the power reception means 220 and the light transmission module 810 provided on the lower end portion of the container body 100 so as to form the electric circuit.

Accordingly, the transparent electrode film 240 may be attached vertically and longitudinally on the surface of the container body 100 made of a transparent material and may function to guide the transmission of the electrical signal between the upper end and lower end of the container body 100.

Accordingly, when the container body 100 is made of the transparent material, and the transparent electrode film 240 is also made of the transparent material, the transparent electrode film 240 may not be visually exposed, and thus the transparent electrode film 240 does not damage the appearance of the container body 100 and may maintain the aesthetic design thereof.

Furthermore, when the transparent electrode film 240 is attached to the surface of the container body 100, the transparent electrode film 240 may have a hole formed therein to remove air bubbles that may be generated between the attached surfaces. That is, a perforated hole may be added to the center of the transparent electrode film 240 made of the ITO film to allow the air bubbles to escape therethrough such that the generation of the air bubbles is prevented.

Meanwhile, a seating step 900 may be formed on the upper surface of the blender body 500 by protruding upward therefrom.

The seating step 900 may be configured to have a circular shape corresponding to the shape of the lower end of the container body 100 such that the lower end of the container body 100 is mounted to the seating step 900 to be vertically removed therefrom.

In addition, the container body 100 may be formed doubly. That is, the container body 100 may be composed of the outer container body 110 and the inner container body 120, and the inner guide 122 may be formed on the inner surface of the inner container body 120 by protruding inward therefrom.

Hereinafter, the configuration of the container body 100 will be described in detail.

FIG. 3 is an exploded perspective view of the container body 100, and FIG. 4 is a bottom perspective view of the container body 100.

As illustrated in these drawings, the container body 100 may be doubly configured to have a cylindrical shape as a whole. That is, the container body 100 may include the outer container body 110 constituting the appearance thereof, and the inner container body 120 provided inside the outer container body 110.

The container body 100, that is, the outer container body 110 and the inner container body 120 may be made of a transparent material. That is, the container body 100 may be made of a transparent material such as glass, tritan, or transparent plastic so that a user can check the state of the food contained inside the container body 100 from the outside.

The outer container body 110 may constitute the appearance of the container body, and be configured to have a cylindrical shape with the same top and bottom sizes, and a main handle 302 may be formed at the outer right surface thereof by protruding therefrom to the right such that a user can grasp the handle.

The main handle 302 may be formed to have an L shape, and the upper end portion thereof may be connected to the right upper end of the outer container body 110. The main handle 302 may be formed integrally with the outer container body 110 by injection molding. Accordingly, the main handle 302 formed integrally with the outer container body 110 may have improved strength and durability compared to the main handle formed as a part separate from the outer container body 110 to be fixed thereto.

The reed switch groove 236 receiving the reed switch 234 may be formed in a portion at which the main handle 302 is connected to the container body 100. That is, the reed switch groove 236 may be formed in the upper end of the main handle 302, and may provide a space to mount the reed switch 234 therein, and the left of such a reed switch groove 236 may be open.

An outer handle 304 and an inner handle 306 may be provided on the outer sides of the main handle 302. That is, as illustrated in FIG. 3, the outer handle 304 may be provided at the right of the inner handle 306, and the inner handle 306 may be provided at the left of the main handle 302.

More particularly, the outer handle 304 may also be configured to have an L shape as a whole like the main handle 302, to cover the upper surface, right surface, and front and rear surfaces of the main handle 302. The outer handle 304 may be made of a material such as stainless steel that has a smooth surface and is resistant to rust, and may not break easily and look beautiful to a user.

The inner handle 306 may cover the left surface and lower surface of the main handle 302, and may be configured to have an L shape so as to correspond to the left and lower surfaces of the main handle 302, and at least a portion thereof may be made of an elastic material.

Particularly, the inner handle 306 may include a connection part 306a covering the lower part of the upper end of the main handle 302, and a grasping part 306b extending downward from the connection part 306a and covering the left surface of the main handle 302.

Like the outer handle 304, the connection part 306a may be made of a smooth and strong material, and the grasping part 306b may be a part on which a user's fingers are wrapped, and be made of an elastic material. That is, the connection part 306a may be made of stainless steel, and the grasping part 306b may be made of an elastic material such as rubber that can give a user a soft touch since the four fingers (except for the thumb) of the user cover the grasping part.

The inner container body 120 may be configured to have a size (a diameter) smaller than the size (a diameter) of the outer container body 110 and may sit inside the outer container body 110.

The inner container body 120 may be configured to have a cylindrical shape having an open upper part. More particularly, as illustrated in the drawings, the inner container body 120 may be configured to have a tapered shape having a diameter gradually decreasing towards the lower side thereof.

In addition, the multiple inner guides 122 may be vertically formed on the inner surface of such an inner container body 120 as described above, and the blade assembly 200 may be mounted to the lower end of the inner container body 120.

The spout 210 may be formed on the left upper end of the inner container body 120 by protruding therefrom to the left, and a covering end 124 may be formed on the right upper end of the inner container body 120 by extending therefrom to the right.

The covering end 124 may cover the upper surface of the reed switch groove 236 of the outer container body 110. The covering end 124 may be configured to be a flat plate having a predetermined thickness, and to have width gradually decreasing towards the right to correspond to the size of the upper end of the reed switch groove 236.

The blade assembly 200 may be mounted to the lower end of the inner container body 120.

The blade assembly 200 is intended to allow food to be finely crushed or mixed by the blades, and may include: a blade shaft 202 rotating by receiving the rotational force generated from the motor assembly 600; a blade body 204 provided at the outside of the blade shaft 202 and supporting the blade shaft 202; and at least one blade 206 connected to the blade shaft 202 and crushing food by rotating.

A magnet holder 404 may be provided on the outer circumferential surface of the container lid 400. That is, as illustrated in FIG. 3, the magnet holder 404 may be formed on the outer circumferential surface of the container lid 400 by protruding therefrom to the outside, and have the permanent magnet 232 mounted therein.

The permanent magnet 232 is intended to control the turning on/off of the reed switch 234 when the container lid 400 is mounted to or removed from the container body 100.

A coil holder assembly may be provided between the outer container body 110 and the inner container body 120.

The coil holder assembly may include a coil holder 130 having an inductive coil, and an upper cover 140 and a lower cover 150 covering the upper and lower sides of the coil holder 130, respectively.

Particularly, the coil holder 130 may be provided between the bottom surface of the outer container body 110 and the lower surface of the inner container body 120, and the power reception means 220 and the light transmission module 810 may be mounted to such a coil holder 130.

The entirety of the coil holder 130 may have the shape of a circular ring having a predetermined thickness, and the power reception means 220 may be provided at the right end of the coil holder 130 having such a ring shape. That is, although not shown in detail, the inductive coil which receives power may be provided at the right end of the coil holder 130, and constitute the power reception means 220.

The power reception means 220 mounted to the coil holder 130 may be embodied with the reception inductive coil patterned on the same plane as the PCB. That is, in the power reception means 220 according to the embodiment of the present disclosure, the reception inductive coil provided on the lower surface of the coil holder 130 may be configured to be wound multiple times on the PCB in a spiral shape relative to a reception center point.

In addition, the light transmission module 810 may be provided on the lower surface of the coil holder 130.

The light transmission module 810 may emit light by power supplied from the power reception means 220. The light transmission module 810 may be configured as a part of the detection means 800, and use the LED emitting light as described above.

The power reception means 220 and the light transmission module 810 may be electrically connected to each other. That is, the power reception means 220 and the light transmission module 810 may be configured to form the closed circuit in cooperation with the on/off means 230. Accordingly, the power reception means 220 and the light transmission module 810 provided in the coil holder 130, and the on/off means 230 may be configured to be electrically connected to each other by the PCB.

In addition, although not shown, the coil holder 130 may further include a conversion module that converts alternating current (AC) into direct current (DC).

A holder terminal 132 may be provided on the upper surface of the right end of the coil holder 130.

The holder terminal 132 may be a part to which the lower end of the transparent electrode film 240 is inserted and connected.

As illustrated in FIG. 3, the coil holder 130 may be configured to have an approximate ring shape as a whole, and the right end of the coil holder 130 may be configured to be relatively large in width such that the power reception means 220 may be mounted thereto.

Multiple grooves may be formed in the outer circumferential surface and inner circumferential surface of the coil holder 130 such that hooks fixing multiple parts pass therethrough.

The coil holder 130 may be protected by the upper cover 140 and the lower cover 150. That is, the upper cover 140 and the lower cover 150 may be provided on the upper surface and lower surface of the coil holder 130, respectively, so as to cover the upper surface and lower surface thereof, the upper cover and lower cover having shapes corresponding to the upper surface and lower surface of the coil holder 130, respectively.

A terminal holder 142 may be formed on the right end of the upper cover 140 by protruding upward therefrom to receive the holder terminal 132 of the coil holder 130 therein. Accordingly, the holder terminal 132 may be received in the terminal holder 142 by being introduced thereto from the lower side of the terminal holder 142, and the upper part of such a terminal holder 142 may be formed to be partially open such that the lower end of the transparent electrode film 240 passes therethrough.

The hooks may be formed on the upper cover 140 such that the upper cover 140 is coupled to the lower cover 150.

As described above, the transparent electrode film 240 may be made of a transparent material such as the ITO film, and may be configured to have a length corresponding to the vertical length of the container body 100.

The transparent electrode film 240 may be provided between the outer container body 110 and the inner container body 120. Accordingly, when the transparent electrode film 240 is provided between the outer container body 110 and the inner container body 120, the transparent electrode film 240 may be prevented from being in contact with food contained in the inner container body 120, and may be prevented from being in contact with foreign matter outside of the outer container body 110.

The transparent electrode film 240 may be attached to the surface of the outer container body 110, or the surface of the inner container body 120. That is, the transparent electrode film 240 may be attached to the inner surface of the outer container body 110 or the outer surface (an outer circumferential surface) of the inner container body 120.

Here, the transparent electrode film 240 attached vertically to the inner surface of the outer container body 110 will be described as an example.

As is illustrated in FIG. 3, the upper and lower ends of the transparent electrode film 240 may be bent at least one time. The lower end of the transparent electrode film 240 may pass through the terminal holder 142 of the upper cover 140 and be connected to the holder terminal 132 of the coil holder 130, and the upper end of the transparent electrode film 240 may be connected to the reed switch 234.

A film guide may be formed vertically on the inner surface of the outer container body 110 to attach the transparent electrode film 240 thereto. That is, the film guide may be formed vertically and longitudinally on the right inner surface of the outer container body 110 and may guide the attachment of the transparent electrode film 240.

A magnet groove 126 may be formed in the upper end of the inner container body 120 by being recessed therefrom towards the outside so as to receive the permanent magnet 232 therein. That is, the upper end of the right surface of the inner container body 120 may be bent to be stepped to the right so as to form the magnet groove 126, and such a magnet groove 126 may be the part in which the permanent magnet 232 is received when the container lid 400 closes on the container body 100.

Meanwhile, the lower surface of the container body 100 may be configured to have a shape corresponding to the shape of the upper surface of the blender body 500 such that the container body 100 may be easily attached to and detached from the upper surface of the blender body 500.

More particularly, the container body 100 may be mounted to the seating step 900 of the blender body 500 to be described below.

Accordingly, the lower surface of the container body 100 may be configured to have a shape corresponding to the shape of the upper end of the blender body 500, so that the container body 100 may be stably mounted to and removed from the blender body 500.

A container body end 170 having a predetermined width may be formed on the lower surface of the container body 100 by protruding downward therefrom. The container body end 170 may be a part which is in contact with the upper surface of a lower step 910 of the blender body 500 to be described below, and may be configured to have a shape corresponding to the upper surface of the lower step 910.

An upper step receiving groove 172 may be formed in the center of the lower surface of the container body 100 by being recessed upward therefrom. That is, the upper step receiving groove 172 may be formed by being recessed upward at the inner side of the container body end 170 of the container body 100. When the container body 100 is mounted to the blender body 500, an upper step 920 of the blender body 500 to be described below may be received in such an upper step receiving groove 172.

The container body end 170 may have the shape of a circular ring having a partially open part, and the open part may be a part in which a coil seating part 940 to be described below is received. That is, the right end of the container body end 170 may be open and a coil seating part groove 170a may be formed therein. The coil seating part 940 to be described below may be received in such a coil seating part groove 170a.

A circular end 174 may be formed on the center of the lower surface of the container body 100 by protruding downward therefrom. That is, the circular end 174 protruding downward may be provided in the center of the upper step receiving groove 172.

As illustrated in FIG. 4, the circular end 174 may have the shape of a circular ring and be hollow therein, which may provide a passage connecting the blade assembly 200 to the motor assembly 600.

The circular end 174 may be a part received in a circular end receiving groove 980 formed in the blender body 500 to be described below.

Multiple mounting protrusions 174a may be formed on the outer circumferential surface of the circular end 174 by protruding radially therefrom. Each of the mounting protrusions 174a may function for tightly mounting the container body 100 to the corresponding position of the blender body 500 such that the container body 100 is not rotated. There may be at least one mounting protrusion 174a.

In the present disclosure, the mounting protrusion 174a is illustrated to have four mounting protrusions 174a. As illustrated in FIG. 4, such a mounting protrusion 174a may be formed to have thickness gradually decreasing towards the outside. This is intended to easily receive the mounting protrusions 174a in protrusion grooves 982 to be described below.

In FIGS. 5 to 7, the configuration of the upper half part of the blender body 500 is illustrated in detail. That is, FIG. 5 is a perspective view of the blender body 500; FIG. 6 is an exploded perspective view illustrating the configuration of the upper half part of the blender body 500; FIG. 7 is a perspective view illustrating the configuration of the blender body 500 from which the cover is removed.

As illustrated in these drawings, the seating step 900 may be provided on the upper surface of the blender body 500 by protruding therefrom to be stepped upward such that the lower surface of the container body 100 is seated thereon.

The seating step 900 may be a part by which the lower end of the container body 100 is seated and be supported. Accordingly, such a seating step 900 may be configured to have a shape corresponding to the shape of the lower part of the container body 100.

Particularly, the seating step 900 may be formed by being stepped, and may include the lower step 910 having a diameter corresponding to the diameter of the lower end of the container body 100, and the upper step 920 formed by protruding upward from the lower step 910 and having a diameter smaller than the diameter of the lower step 910.

As illustrated in the drawing, the lower step 910 may be configured to have a circular shape and a predetermined height, and the upper step 920 having a diameter smaller than the diameter of the lower step 910 may be formed on the upper part of such a lower step 910 by protruding upward therefrom to have a predetermined height. Accordingly, a horizontal step surface 902 may be formed between the lower step 910 having the larger diameter and the upper step 920 having the smaller diameter.

An lower step ring 912 and an upper step ring 914 having shapes corresponding to the outer surfaces of the lower step 910 and the upper step 920, respectively, may be provided on the outer surfaces of the lower step 910 and the upper step 920, respectively. That is, the lower step ring 912 and the upper step ring 914 may be provided on the outer circumferential surfaces of the lower step 910 and the upper step 920, respectively, which have the outer surfaces of circular shapes, and may cover the outer surfaces (side surfaces) of the lower step 910 and the upper step 920.

The lower step ring 912 and the upper step ring 914 may protect parts thereinside and may function as exterior materials. Accordingly, like the outer handle 304, the lower step ring 912 and the upper step ring 914 may be made of a material such as stainless steel which has a smooth surface and is resistant to rust.

In addition, an elastic member 930 made of an elastic material may be provided on the step surface 902 provided between the upper step 920 and the lower step 910. As illustrated in the drawing, the elastic member 930 may be configured to cover the step surface 902 formed on the upper surface of the lower step 910, and cover the lower half part of the upper step 920.

The elastic member 930 may be made of an elastic material, and thus may function to buffer impact which may be generated when the container body 100 sits on the blender body 500. That is, when the lower surface of the container body 100 sitting on the upper step 920 is in contact with the upper step 920, the elastic member 930 may function to prevent breakage or noise that may occur due to the collision of the lower surface of the container body 100 with the upper step 920 and the lower step 910 of the blender body 500, which are made of solid materials.

Accordingly, the elastic member 930 may be made of a material such as rubber, and may function to make the seating of the container body 100 efficient. Further, the elastic member 930 may be made of a conductive rubber when required, and in this case, the conductive rubber may be provided even on the lower surface of the container body 100.

The power transmission means 700 and the light reception module 820 may be mounted to the upper surface of the upper step 920.

Particularly, the coil seating part 940 may be formed on the right surface of the upper step 920 by protruding therefrom to the right, and the power transmission means 700 may be mounted to the upper surface of such a coil seating part 940.

The power transmission means 700 may be located to be adjacent to the power reception means 220 provided in the container body 100, and may function to supply power to the power reception means 220. Accordingly, such a power transmission means 700 may be configured as an inductive coil. That is, like the power reception means 220, the inductive coil may be configured by being wound multiple times on the same plane, such as a PCB, in a spiral shape relative to a transmission center point (not shown).

In addition, the blender body 500 may have an oscillation circuit part therein. Such an oscillation circuit part may generate current and apply the current to the power transmission means 700. Accordingly, a magnetic field may be formed in the power transmission means 700 by the applied current. Furthermore, the oscillation circuit part may change the intensity of the current applied to the power transmission means 700, and thus the magnetic field may be changed in the power transmission means 700 by the change of the current intensity.

Accordingly, as in the present disclosure, with the power reception means 220 and the power transmission means 700 installed to vertically correspond to each other, as the intensity of current applied to the power transmission means 700 changes, the magnetic field of the power transmission means 700 may be changed, and a magnetic flux passing through the power reception means 220 may be changed due to inductive coupling between the power transmission means 700 and the power reception means 220, so the induced electromotive force may be generated in the power reception means 220. Furthermore, such an induced electromotive force may be supplied to the light transmission module 810.

The light reception module 820 may be provided at a side opposite to the power transmission means 700. That is, the light reception module 820 may be mounted in a receiving groove 822 formed in the left end of the upper surface of the upper step 920, which is a position vertically corresponding to the light transmission module 810 mounted to the container body 100.

Particularly, the receiving groove 822 having a predetermined size may be formed in the left end of the upper surface of the upper step 920 by being depressed therefrom, and the light reception module 820 may be mounted in such a receiving groove 822.

As described above, the light reception module 820 may include the photodetector. The light reception module 820 may receive light transmitted by the light transmission module 810, and transmit a light reception signal.

In addition, a Hall sensor 950 and a container body detection switch 960 may be provided on the upper surface of the upper step 920. That is, a container body switch groove 962 and a sensor groove 952 may be formed in the front end portion and rear end portion of the upper surface of the upper step 920, respectively, by being depressed therefrom, and the container body detection switch 960 and the Hall sensor 950 may be mounted in the container body switch groove 962 and the sensor groove 952, respectively.

The container body detection switch 960 may be configured as a reed switch, and may detect whether the container body 100 is seated on the upper surface of the blender body 500. When such a container body detection switch 960 is provided, a magnet corresponding thereto may be provided on the lower end of the container body 100.

The Hall sensor 950 is intended to determine the type of the container body 100 sitting on the blender body 500, and even in this case, a signal transmission means corresponding thereto may be required on the lower surface of the container body 100.

The upper step ring 914 mounted to the edge of the upper step 920 may be configured to be divided into two parts. That is, as illustrated in FIG. 6, the upper step ring 914 may include a protruding piece 916 covering the outer surface of the coil seating part 940 formed on the right surface of the upper step 920 by protruding therefrom to the right, and a curved piece 918 covering the remaining outer surface of the upper step 920.

Meanwhile, the upper part of the upper step 920 may be covered by a cover 970. Accordingly, the power transmission means 700, the light reception module 820, the container body detection switch 960, and the Hall sensor 950 mounted to the upper step 920 may be covered and protected by the cover 970.

In addition, the seating step 900 may have a center vertically formed therethrough such that the blade assembly 200 of the container body 100 and the motor assembly 600 provided in the blender body 500 may be connected to each other.

More particularly, the circular end receiving groove 980 may be formed in the center portion of the upper step 920 by being depressed therefrom, and the circular end 174 of the lower end of the container body 100 described above may be received in such a circular end receiving groove 980. That is, the upper step 920 may have the shape of a circular ring as a whole, and the circular end receiving groove 980 having a circular shape may be formed in the center portion of such an upper step 920.

At least one protrusion groove 982 may be formed in the inner surface of the upper step 920. The protrusion groove 982 may be formed by being depressed radially from the circular end receiving groove 980, and the mounting protrusions 174a of the container body 100 may be seated in the protrusion grooves 982.

Accordingly, the protrusion grooves 982 may be configured to have the size and number thereof corresponding to the size and number of the mounting protrusions 174a, and the size of the width of the protrusion groove 982 may be configured to be the same as or larger than the size of the width of the mounting protrusion 174a.

Figure 8:
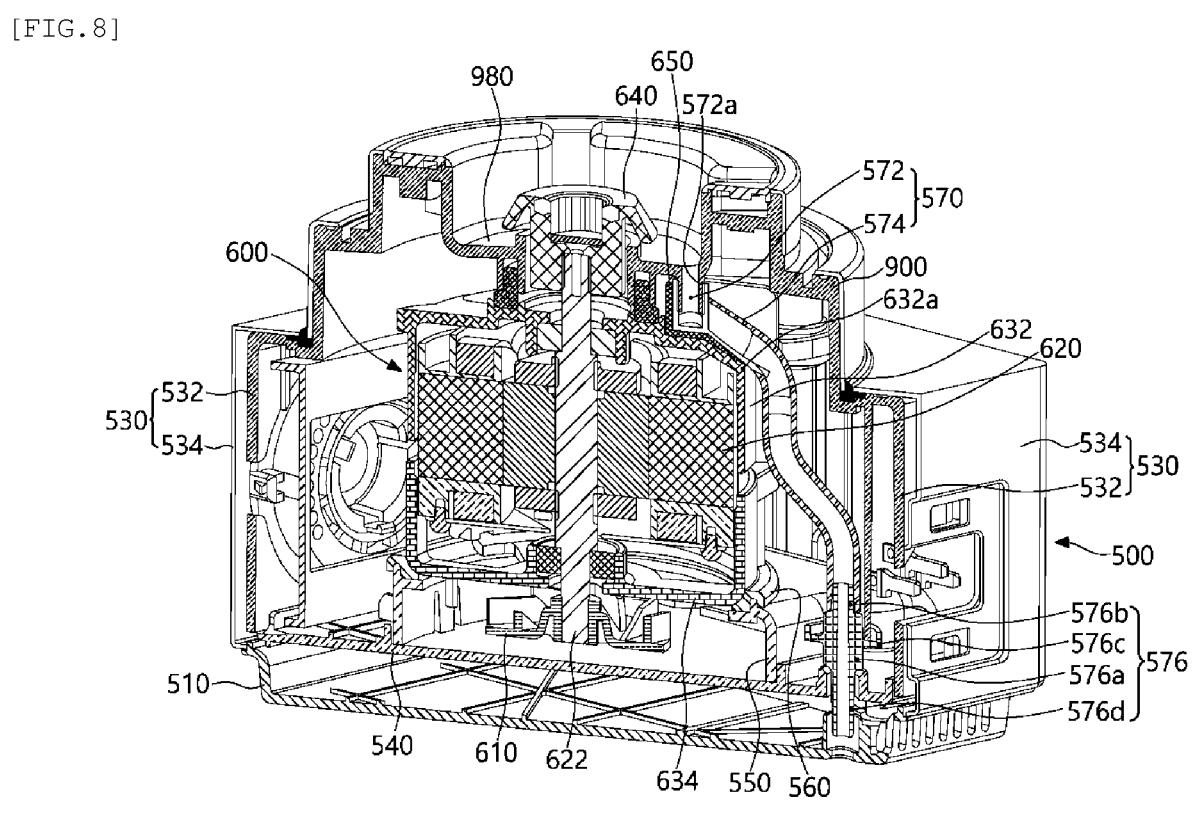

In FIGS. 8 to 10, the configuration of the blender body 500 is illustrated further in detail. That is, FIG. 8 is a cut-away view illustrating the configuration of the inside of the blender body 500; FIG. 9 is a perspective view illustrating the configuration of the inside of the blender body 500 from which the seating step 900 and a blender body casing 530 are removed; and FIG. 10 is an exploded perspective view illustrating the blender body 500 from which a discharge hose 574 and a discharge guide 650 are removed.

As illustrated in these drawings, the blender body 500 may be formed as a hexahedral shape as a whole, and the approximate appearance thereof may be constituted by the blender body casing 530.

As illustrated in FIG. 8, the blender body casing 530 may be configured as a hexahedron having a rectangular box shape having an open lower part, and the lower side of such a blender body casing 530 may be covered by the base end 510 described above.

The seating step 900 may constitute a portion of the upper appearance of the blender body casing 530. That is, the seating step 900 may be formed at the center of the upper surface of the blender body casing 530, so that such a seating step 900 may constitute a portion of the upper surface of the blender body 500.

In addition, the blender body casing 530 may be formed doubly. That is, the blender body casing 530 may be composed of an inner casing 532 and an outer casing 534 provided at the inner side thereof and the outer side thereof, respectively. The outer casing 534 may be made of metal or a material having a metallic texture.

The inner casing 532 may be provided inside the outer casing 534, and may support multiple parts there inside. Accordingly, a space in which the motor assembly 600 described above and a PCB module are mounted may be provided inside the inner casing 532.

The motor assembly 600 may be mounted in the center of the blender body 500, and may include a motor 620 provided such that a motor shaft 622 passes vertically through the center portion thereof, and a motor housing 630 constituting the appearance of the motor 620.

The motor housing 630 may include an upper housing 632 covering the upper half part of the motor 620, and a lower housing 634 covering the lower half part of the motor 620, wherein the upper housing 632 and the lower housing 634 may be securely coupled to each other by multiple coupling bolts 636.

The motor shaft 622 may be provided vertically and longitudinally inside the blender body 500, wherein the cooling fan 610 described above may be coupled to the lower end of the motor shaft, and a power transmission end 640 connected to the blade assembly 200 may be connected to the upper end thereof. The power transmission end 640 may be formed by protruding to the outside of the upper portion of the blender body 500, and may transmit the rotational force of the motor 620 to the blade assembly 200.

Multiple PCB modules 542 may be provided inside the blender body 500.

Particularly, the open lower surface of the inner casing 532 constituting the blender body casing 530 may be covered by a base plate 540, and the multiple PCB modules 542 may be installed on the upper side of such a base plate 540.

The base plate 540 may be configured to have the shape of a rectangular plate having a size corresponding to the open lower surface of the inner casing 532, and the edge of such a base plate 540 may be coupled to the lower end of the inner casing 532.

Inside the inner casing 532, the multiple PCB modules 542 may be arranged by being spaced apart from each other, and may be installed by being separated from each other by function. That is, the multiple PCB modules 542 may be arranged outside the motor assembly 600 by being spaced apart from each other to surround the motor assembly 600, and may include: a main PCB module controlling the entire operation of the blender; an inverter PCB module controlling the motor 620; a power PCB module controlling input power; and a filtering PCB module removing noise.

In addition, in such PCB modules 542, an additional PCB module may be provided or some of the PCB modules may be omitted according to the function of the blender of the present disclosure.

A heat dissipating member 544 may be mounted to the PCB module 542 to dissipate heat. As illustrated in FIG. 9, the heat dissipating member 544 may be mounted to at least one PCB module 542 of the multiple PCB modules 542 to be in contact therewith, and multiple dissipating fins may be configured to be in contact with air so as to dissipate heat.

An air guide 550 may be provided on the upper surface of the base plate 540.

The air guide 550 may guide the discharge of air blown by the cooling fan 610, and the motor assembly 600 may sit on the upper surface of such an air guide 550, wherein the cooling fan 610 may be located inside the air guide 550.

Accordingly, when the cooling fan 610 rotates together with the motor shaft 622, outside air may be introduced into the motor housing 630; flow downward through the inside thereof; and be discharged to the outside through the air guide 550 by being blown by the cooling fan 610.

A sealing member 560 may be provided between the air guide 550 and the motor assembly 600. That is, the motor assembly 600 may sit on the upper surface of the air guide 550, and the sealing member 560 may be provided on the edge of a seating surface of the lower end of such a motor assembly 600.

The sealing member 560 may be made of an elastic material such as rubber, and may protect the motor assembly 600 sitting on the air guide 550 from impact, and cover a gap between the motor assembly 600 and the air guide 550 to stop the movement of air or liquid thereinto.

Meanwhile, a discharge part 570 may be provided in the blender body 500, the discharge part allowing liquid or foreign matter accumulated on the upper surface of the blender body 500 to be discharged to the outside.

The discharge part 570 may include a discharge hole 572 guiding liquid or food accumulated on the upper surface of the blender body 500 downward, and the discharge hose 574 provided at the lower side of the discharge hole 572, the discharge hose guiding the liquid or food falling downward through the discharge hole 572 towards the lower end of the blender body 500.

As illustrated in FIG. 8, the discharge hole 572 may be configured as a circular hole having an inner diameter of a predetermined size by being formed vertically through the upper surface of the blender body 500.

More particularly, the discharge hole 572 may be formed in the circular end receiving groove 980 formed in the center portion of the upper step 920 by being depressed from the center portion.

In addition, a hole connection part 572a may be formed on the lower end of the discharge hole 572 by extending downward therefrom, the hole connection part guiding liquid and foreign matter, which are introduced into the discharge hole 572, towards the inside of the blender body 500.

Particularly, the lower end of the discharge hole 572 formed vertically through the bottom surface of the circular end receiving groove 980 may extend downward and form the hole connection part 572a. Accordingly, such a hole connection part 572a may have a narrow cylindrical shape having an inner diameter corresponding to the inner diameter of the discharge hole 572.

The hole connection part 572a may be a part to which the upper end of the discharge hose 574 is coupled by fitting. More particularly, the hole connection part 572a may be a part over which a press-fit end 574a of the discharge hose 574 to be described below is fitted.

As illustrated in FIG. 8, the discharge hose 574 may connect the upper end of the inside of the blender body 500 to the lower end thereof, and may function as a path guiding foreign matter or liquid on the upper surface of the blender body 500 to the lower portion of the blender body 500.

Accordingly, the discharge hose 574 may be provided inside the blender body 500, and may guide the foreign matter or liquid on the upper surface of the blender body 500 towards the lower portion of the blender body 500.

Accordingly, such a discharge hose 574 may be formed to have a predetermined length, and may have a hole having a diameter of a predetermined size formed therein so as to facilitate the movement of foreign matter or liquid. Furthermore, the discharge hose 574 may be configured to have curvature so as to prevent interference thereof with other parts provided inside the blender body 500.

The discharge hose 574 may be made of a material having elasticity, but may be made of metal or plastic.

The press-fit end 574a covering the hole connection part 572a may be provided on the upper end of the discharge hose 574 such that the discharge hose 574 is coupled to the hole connection part 572a As illustrated in FIG. 9, the press-fit end 574a may be formed to have an upper portion having an open cylindrical shape and to have an inner diameter having a size corresponding to the outer diameter of the hole connection part 572a, and thus may be coupled to the hole connection part 572a to cover the hole connection part 572a from the outside.

Accordingly, coupling the press-fit end 574a to the hole connection part 572a such that the press-fit end 574a covers the hole connection part 572a from the outside is to prevent a gap between the press-fit end 574a and the hole connection part 572a and allow the introduced liquid to be discharged downward through the inside of the discharge hose 574.

In addition, in the case in which the press-fit end 574a is made of an elastic material such as rubber, the inner diameter of the press-fit end 574a may be formed to be smaller than the outer diameter of the hole connection part 572a.

The press-fit end 574a may be mounted to the upper surface of a seating surface 652 of the discharge guide 650 to be described below by being placed thereon.

A hose holder 576 may be provided in the blender body 500, the hose holder allowing the lower end of the discharge hose 574 to be fixed to the lower end of the blender body 500.

The hose holder 576 is intended to fix and support the lower end of the discharge hose 574, and may include: a holder body 576a having a cylindrical shape mounted to the lower end portion of the blender body 500; a hose insertion part 576b formed by extending upward from the holder body 576a and inserted into the discharge hose 574; a holder wing 576c formed by protruding from the outer circumferential surface of the holder body 576a to the outside and guiding the seating of the hose holder 576 in the blender body 500; and a holder discharge part 576d formed by extending downward from the lower end of the holder body 576a.

As illustrated in FIG. 8, the holder body 576a may be configured to have open upper and lower ends and a cylindrical shape having a predetermined thickness, and the outer diameter thereof may be formed to have size larger than or corresponding to the outer diameter of the discharge hose 574.

The hose insertion part 576b may be formed by extending from the upper end of the holder body 576a to have a predetermined length upward therefrom, and the inner diameter thereof may be formed to have size corresponding to the holder body 576a, and the outer diameter thereof may have a size to be received into the discharge hose 574.

Of course, in the case in which the discharge hose 574 is made of an elastic material, the outer diameter of the hose insertion part 576*b* may be formed to be larger than the inner diameter of the lower end of the discharge hose 574.

As illustrated in FIG. 8, the holder wing 576*c* may have a shape vertically bent upward after protruding by a predetermined distance from the outer surface of the center of the holder body 576*a* to the outside. That is, the holder wing 576*c* may be formed to have a section of an L shape (see FIG. 8), and be coupled to ribs located inside the blender body 500.

The holder discharge part 576*d* may be formed by extending from the lower end of the holder body 576*a* to have a predetermined length downward therefrom, and may be mounted to pass through the base plate 540.

As illustrated in FIG. 8, the hose holder 576 may be mounted to the base plate 540, and may fix and support the lower end of the discharge hose 574 and may guide the discharge of liquid flowing through the discharge hose 574 towards the lower side of the base plate 540.

The discharge guide 650 may be provided in the blender body 500, the discharge guide supporting an end of the discharge hose 574.

Particularly, the discharge guide 650 may be provided on the upper surface of the motor assembly 600, and may function to prevent liquid being introduced into the blender body 500 by passing through the upper surface of the blender body 500 and being introduced into the motor assembly 600.

For example, even in the case in which liquid introduced into the blender body 500 is not introduced into the discharge hose 574, the liquid may be guided by the discharge guide 650 and thus may be prevented from being introduced into the motor assembly 600. Furthermore, even when the upper end portion of the discharge hose 574 placed at the upper side of the discharge guide 650 is broken or torn, the discharge guide 650 may guide liquid leaking from the discharge hose 574 such that the liquid is prevented from being introduced into the motor assembly 600, and may function to allow the liquid to flow down to the outside of the motor assembly 600.

In addition, a seating guide surface 632*a* may be formed on the motor assembly 600 to seat the discharge guide 650 thereon.

The seating guide surface 632*a* may be formed on the upper surface of the motor housing 630 constituting the motor assembly 600, and may be formed by slanting downward to have height gradually decreasing from the upper surface of the motor housing 630.

Particularly, as described above, the motor housing 630 may include the upper housing 632 and the lower housing 634, and the seating guide surface 632*a* may be formed on any edge of the upper surface of the upper housing 632 and slanting downward to have the height gradually decreasing therefrom.

Accordingly, the discharge guide 650 may be mounted to the upper surface of the upper housing 632 while sitting on the seating guide surface 632*a*.

In addition, as illustrated in FIG. 10, multiple housing holes 638 may be formed vertically through the upper surface of the upper housing 632.

FIGS. 11 and 12 illustrate a perspective view of the discharge guide 650, and a partial cut-away perspective view illustrating the state of the discharge guide 650 mounted to the motor assembly 600, respectively.

As illustrated in these drawings, the discharge guide 650 may include: the seating surface 652 placed on the upper surface of the motor housing 630; a pair of side surfaces 654 formed by bending upward and extending from the opposite ends of the seating surface 652; an inner surface 655 connecting the pair of side surfaces 654 to each other; and a discharge guide surface 656 formed by extending from the seating surface 652 and being in close contact with the seating guide surface 632*a*.

As illustrated in FIG. 11, the seating surface 652 may be formed to have a flat surface corresponding to the upper surface of the upper housing 632 so as to be mounted to the upper surface of the upper housing 632 by being in close contact therewith.

The pair of side surfaces 654 may be formed by bending upward vertically and extending from the opposite ends of the seating surface 652, and may function to prevent liquid falling down to the seating surface 652 from being removed to the sides therefrom.

The inner surface 655 may connect the ends of the pair of side surfaces 654 to each other, and may cover the upper portion of the rear end of the seating surface 652, the inner surface being configured as a plate having curvature rounded by protruding from the center of the blender body 500 to the outside. That is, as illustrated in FIG. 11, the inner surface 655 may be formed to have a shape protruding roundly towards the front thereof.

Accordingly, the inner surface 655 may have the shape protruding roundly towards the front thereof such that the inner surface avoids interference thereof with the vicinity of the motor shaft 622 of the motor assembly 600.

The discharge guide surface 656 may be configured to have height gradually decreasing towards the front thereof (see FIG. 11), and may have an inclination corresponding to the inclination of the seating guide surface 632*a*. Accordingly, the discharge guide surface 656 may be mounted to the seating guide surface 632*a* of the motor assembly 600 to be in close contact therewith.

The pair of side surface guides 658 may be formed on the opposite ends of the discharge guide surface 656 by extending from the pair of side surfaces 654. That is, the side surface guides 658 may be formed by extending upward vertically from the opposite ends of the discharge guide surface 656, and may be formed on the fronts of the pair of side surfaces 654 by extending therefrom.

Meanwhile, a guide hook 654*a* may be provided in the discharge guide 650, the guide hook allowing the discharge guide 650 to be mounted to the motor housing 630.

Particularly, the guide hook 654*a* may be formed by extending downward from the pair of side surfaces 654. The lower end of the guide hook 654*a* may be formed to have a hook shape and thus pass through the housing holes 638, and be held on the upper surface of the upper housing 632 by one touch.

In addition, a guide rib 654*b* may be provided in the discharge guide 650, the guide rib allowing the discharge guide 650 to be maintained at a predetermined position thereof after the discharge guide is mounted to the upper surface of the motor housing 630.

The guide rib 654*b* may be formed by extending downward from the pair of side surfaces 654 or the pair of side surface guides 658. Furthermore, the guide rib 654*b* may be inserted into the housing hole 638 formed vertically through the upper surface of the motor housing 630.

Particularly, as illustrated in FIG. 11, the guide rib 654*b* may be formed at the boundary of the pair of side surfaces 654 and the side surface guides 658, and may extend downward more than each of the side surfaces 654, so that the lower end of the guide rib 654*b* may be inserted into the housing hole 638.

In this case, the size of the width of the upper surface of the upper housing 632 between the multiple housing holes 638 may correspond to the size of the width of the seating surface 652 of the discharge guide 650, so that after each of the pair of guide ribs 654b is inserted into the different housing holes 638, the discharge guide 650 may not be rotated and maintain the mounted state thereof.

That is, as illustrated in FIG. 12, when the discharge guide 650 is mounted to the upper surface of the upper housing 632, each of the pair of guide hooks 654a may be inserted into the different housing holes 638, and be mounted to the upper surface of the upper housing 632, and each of the pair of guide ribs 654b may also be inserted into the different housing holes 638, so that the mounted state of the discharge guide 650 may be maintained.

FIG. 13 is the top plan view of the blender body according to the embodiment of the present disclosure, and FIG. 14 is a partial perspective view illustrating the state of a blocking rib 660 mounted to the blender body 500 according to the embodiment of the present disclosure.

As illustrated in these drawings, the discharge hole 572 described above is formed in the upper surface of the blender body 500, and the blocking rib 660 may be provided on such a discharge hole 572 to block the introduction of foreign matter thereinto. That is, the blocking rib 660 may be installed on the discharge hole 572 to cross over the discharge hole 572 so that foreign matter located on the upper portion of the circular end receiving groove 980 of the blender body 500 is prevented from being introduced into the discharge hole 572 so as to prevent the inside of the discharge hole 572 from being blocked.

The blocking rib 660 may include a crossbar 662 crossing the discharge hole 572, and a support part 664 allowing the crossbar 662 to be spaced apart by a predetermined distance from the upper end of the discharge hole 572.

As illustrated in FIG. 14, the support part 664 may be formed on the opposite ends of the upper surface of the discharge hole 572 by extending upward by a predetermined distance therefrom. The upper ends of such a pair of support parts 664 may be connected to each other to form the crossbar 662. Accordingly, the blocking rib 660 is intended to prevent foreign matter of a predetermined size from being introduced to the discharge hole 572 so as to prevent the discharge hole 572 from being blocked. Accordingly, the height of the support part 664 may be configured to have size smaller than the size of the inner diameter of the discharge hole 572 so as to block foreign matter having a larger size from passing through the discharge hole.

Hereinafter, the operation of the blender of the present disclosure having the above-described configuration will be described with reference to the accompanying drawings.

When the container body 100 sits on the blender body 500, the state of FIG. 1 may be realized, and in this state, the operation of the blender of the present disclosure may start.

First, power supply from the outside is required such that a user can operate the blender, and a wireless power supply device having the wireless power module 520 may be used for such power supply. That is, the power supply from the outside may be performed by the induced electromotive force. Of course, the power supply may be performed by wire.

The power of the wireless power module 520 may be supplied to parts of the blender, in which power is required, such as the motor assembly 600, the manipulation part 504, and the power transmission means 700, and a user may start or stop the operation of the blender by manipulating the manipulation part 504 or the knob 502.

For example, when a user starts crushing food by manipulating the manipulation part 504 or the knob 502, the motor assembly 600 is required to be operated to rotate the blades of the blade assembly 200.

However, in this case, the detection system may determine whether the container lid 400 is closed, and when the container lid 400 is opened, the motor assembly 600 and thus the blade assembly 200 may not operate.

Particularly, since the reed switch 234 may be normally open (off), the power reception means 220, the reed switch 234, and the light transmission module 810 may not form a closed circuit in the container body 100, and thus the light reception module 820 may not receive light.

Accordingly, when the light reception module 820 does not receive light, the power supply to the motor assembly 600 may be cut off by such a signal or lack of such signal.

In this state, when the container lid 400 is closed, the permanent magnet 232 of the container lid 400 may be located to be adjacent to the reed switch 234, and the reed switch 234 may be turned on, whereby the power reception means 220, the reed switch 234, and the light transmission module 810 may form a closed circuit, so that the light reception module 820 may receive light transmitted by the light transmission module 810.

In this case, due to the detection of the closing of the container lid 400, the motor assembly 600 may start operating by the manipulation of a user, and food inside the container body 100 may be crushed. Of course, in this case, whether the container body 100 is mounted to the blender body 500 may be detected by the container body detection switch 960 prior to the starting of the operation of the motor assembly 600.

In addition, in this case, the operation state of the blender of the present disclosure may be displayed to the outside by the display part 506, so that a user may visually recognize the operation state or time of the blender.

Meanwhile, when the container lid 400 is mounted to or removed from the container body 100, a user may open or close the container lid 400 by grasping the upper half part of the cap 450. The container lid 400 may be in close contact with and mounted to the upper surface of the container body 100 by a force of pushing the container lid 400 downward by a user. In this case, the gap between the container lid 400 and the container body 100 may be covered by the gasket 402 provided on the outer surface of the container lid 400.

In addition, a user may remove the cap 450 mounted to the center of the container lid 400 therefrom, and this can be performed by the action of the user holding and rotating the upper end of the cap 450, for example.

When the cap 450 is removed from the container lid 400, through the lid hole 401, a user may insert food into the container body 100, and may control food contained inside the container body 100 by using a rod.

When food inside the container body 100 is crushed or mixed by the operation of the motor assembly 600 and the blade assembly 200 and work according to the intention of a user is completed, the user may raise and remove the container body 100 upward from the blender body 500, open the container lid 400, and take out the food contained inside the container body 100.

Furthermore, the discharge hole 572 may be formed vertically through the upper surface of the blender body 500, and such a discharge hole 572 may communicate with the discharge hose 574 and the hose holder 576. Accordingly, even when liquid such as water is accumulated in the circular end receiving groove 980, the liquid may be discharged to the lower end of the blender body 500 through the discharge hole 572 and the discharge hose 574.

Meanwhile, the blocking rib 660 may be formed on the discharge hole 572, and thus foreign matter may be prevented from being introduced into the discharge hole 572 so as to prevent the discharge hole 572 from being blocked.

The scope of the present disclosure is not limited to the embodiment illustrated above, and within the technical scope as described above, many other modifications based on the present disclosure will be possible for those skilled in the art.

For example, in the embodiment, the blocking rib 660 may be configured to include the crossbar 662 and the support part 664 such that the crossbar 662 is spaced apart by a predetermined distance upward from the discharge hole 572. However, by omitting the support part 664, the crossbar 662 may be configured to directly cross the upper end of the discharge hole 572.

What is claimed is:

1. A blender comprising:
   a container body to receive food;
   a blender body to support the container body;
   a container lid to open and close an upper opening of the container body;
   a discharge part to guide a discharge of liquid or foreign matter accumulated on an upper surface of the blender body to an outside,
   wherein the discharge part comprises:
   a discharge hole to discharge the liquid or foreign matter accumulated on the upper surface of the blender body;
   a discharge hose provided inside the blender body to guide the liquid or foreign matter discharged through the discharge hole; and
   a discharge guide provided at the blender body to support the discharge hose, and
   wherein the blender body includes a motor assembly to generate a rotational power, and the discharge guide is provided on an upper surface of the motor assembly, and
   wherein the motor assembly includes a motor housing and a seating guide surface to seat the discharge guide thereon, and
   wherein the seating guide surface is disposed on an upper surface of the motor housing, and is formed slanting downward, and
   wherein the discharge guide comprises:
   a seating surface disposed on the upper surface of the motor housing;
   a pair of side surfaces bending upward and extending from opposite ends of the seating surface;
   an inner surface connecting the pair of side surfaces to each other; and
   a discharge guide surface extending from the seating surface and being in contact with the seating guide surface, and
   wherein the inner surface is configured as a plate having a rounded curvature by protruding with respect to a center of the blender body towards the outside; and
   wherein the discharge guide includes a guide hook to mount the discharge guide to the motor housing.

2. The blender of claim 1, wherein the discharge guide surface has an inclination corresponding to an inclination of the seating guide surface.

3. The blender of claim 2, wherein the discharge guide includes a pair of side surface guides on opposite ends of the discharge guide surface and extending from the pair of side surfaces.

4. The blender of claim 1, wherein the guide hook extends from the pair of side surfaces.

5. The blender of claim 4, wherein the discharge guide includes a guide rib to maintain the discharge guide at a predetermined position when the discharge guide is mounted to the upper surface of the motor housing.

6. The blender of claim 5, wherein the guide rib extends downward from the pair of side surfaces or the pair of side surface guides.

7. The blender of claim 6, wherein the guide rib inserts into a housing hole at the upper surface of the motor housing.

8. The blender of claim 7, further comprising a hole connection part extending downward from the discharge hole, the hole connection part to guide the liquid or foreign matter, which are discharged through the discharge hole, towards the inside of the blender body.

9. The blender of claim 8, wherein the discharge hose includes a press-fit end to couple the discharge hose to the hole connection part.

10. The blender of claim 9, wherein the press-fit end is disposed at an upper surface of the seating surface of the discharge guide.

11. The blender of claim 1, wherein the blender body includes a hose holder at a lower end of the blender body and a lower end of the discharge hose is fixed to the hose holder.

12. The blender of claim 1, further comprising a blocking rib disposed at the discharge hole,
   the blocking rib to block an introduction of the foreign matter having a predetermined size into the discharge hole.

* * * * *